US011658898B2

(12) United States Patent
Shah et al.

(10) Patent No.: US 11,658,898 B2
(45) Date of Patent: May 23, 2023

(54) ROUTING NETWORK TRAFFIC BASED ON DESTINATION

(71) Applicant: Cisco Technology, Inc., San Jose, CA (US)

(72) Inventors: Himanshu Shah, Milpitas, CA (US); Murtuza Attarwala, Davis, CA (US); Linus Aranha, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 73 days.

(21) Appl. No.: 16/991,400

(22) Filed: Aug. 12, 2020

(65) Prior Publication Data

US 2020/0374215 A1 Nov. 26, 2020

Related U.S. Application Data

(63) Continuation of application No. 15/591,065, filed on May 9, 2017, now Pat. No. 10,771,375.

(51) Int. Cl.
| | |
|---|---|
| *H04L 12/701* | (2013.01) |
| *H04L 12/715* | (2013.01) |
| *H04L 12/721* | (2013.01) |
| *H04L 45/00* | (2022.01) |
| *H04L 43/028* | (2022.01) |
| *H04L 69/16* | (2022.01) |

(Continued)

(52) U.S. Cl.
CPC ............ *H04L 45/22* (2013.01); *H04L 43/026* (2013.01); *H04L 43/028* (2013.01); *H04L 43/08* (2013.01); *H04L 45/74* (2013.01); *H04L 45/745* (2013.01); *H04L 61/4511* (2022.05); *H04L 69/16* (2013.01); *H04L 45/125* (2013.01); *H04L 45/302* (2013.01); *H04L 45/306* (2013.01); *H04L 45/308* (2013.01); *H04L 45/64* (2013.01)

(58) Field of Classification Search
None
See application file for complete search history.

(56) References Cited

U.S. PATENT DOCUMENTS

| | | | |
|---|---|---|---|
| 6,396,833 B1 | 5/2002 | Zhang et al. | |
| 7,720,997 B1 | 5/2010 | Gourlay et al. | |

(Continued)

FOREIGN PATENT DOCUMENTS

CN  102215154 A  10/2011

OTHER PUBLICATIONS

Communication pursuant to Article 94(3) issued by the European Patent Office dated May 26, 2021, 10 pages, for corresponding European Patent Application No. 18730173.4.

(Continued)

*Primary Examiner* — Scott M Sciacca
(74) *Attorney, Agent, or Firm* — Polsinelli

(57) ABSTRACT

A method may include identifying an address within a packet of a traffic flow associated with a network device. The method may also include comparing the address within the packet with a stored address, the stored address associated with a route for an alternative traffic path, where the alternative traffic path may be different from a default route of traffic passing through the network device. The method may additionally include, based on the address within the packet matching the stored address, routing the packet along the alternative traffic path instead of the default route of traffic.

20 Claims, 10 Drawing Sheets

(51) Int. Cl.
    *H04L 43/08*    (2022.01)
    *H04L 43/026*   (2022.01)
    *H04L 45/745*   (2022.01)
    *H04L 45/74*    (2022.01)
    *H04L 61/4511*  (2022.01)
    *H04L 45/302*       (2022.01)
    *H04L 45/125*       (2022.01)
    *H04L 45/64*        (2022.01)

(56) References Cited

U.S. PATENT DOCUMENTS

| | | | |
|---|---|---|---|
| 9,729,350 B1* | 8/2017 | Cohn | ............... H04L 47/283 |
| 2005/0207411 A1 | 9/2005 | Ota | |
| 2008/0089334 A1 | 4/2008 | Soja-Molloy | |
| 2009/0274040 A1 | 11/2009 | Karacali-Akyamac | |
| 2010/0226372 A1 | 9/2010 | Watanabe | |
| 2013/0022033 A1 | 1/2013 | Shu | |
| 2013/0077493 A1* | 3/2013 | Aissaoui | ............... H04L 45/124 |
| | | | 370/235 |
| 2013/0163412 A1 | 6/2013 | Hughes | |
| 2013/0279365 A1 | 10/2013 | Hui | |
| 2013/0329601 A1* | 12/2013 | Yin | ............... H04L 45/34 |
| | | | 370/254 |
| 2014/0029447 A1* | 1/2014 | Schrum, Jr. | ............. H04L 1/203 |
| | | | 370/252 |
| 2014/0233385 A1 | 8/2014 | Believeau et al. | |
| 2015/0195149 A1 | 7/2015 | Vasseur | |
| 2016/0043932 A1* | 2/2016 | Karthikeyan | ......... H04L 45/123 |
| | | | 370/390 |
| 2016/0269975 A1 | 9/2016 | Watanabe | |
| 2017/0085468 A1 | 3/2017 | Modi et al. | |
| 2018/0227223 A1 | 8/2018 | Hughes | |

OTHER PUBLICATIONS

English translation of the First Office Action, dated Apr. 2, 2021, by the National Intellectual Property, PRC, 32 pages, for corresponding Chinese Patent Application No. 201880030358.5.
International Search Report and Written Opinion from PCT Application No. PCT/US2018/030774 dated Aug. 3, 2018.

* cited by examiner

ROUTING NETWORK TRAFFIC BASED ON DESTINATION

CROSS-REFERENCE TO RELATED APPLICATION

This application is a continuation of U.S. patent application Ser. No. 15/591,065, filed on May 9, 2017, which issued on Sep. 8, 2020 as U.S. Pat. No. 10,771,375, the content of which is expressly incorporated by reference herein in its entirety.

FIELD

The embodiments discussed in the present disclosure are related to routing network traffic.

BACKGROUND

The use of networks is a useful tool in allowing communication between distinct computing devices. Despite the proliferation of computers and networks over which computers communicate, there still remain various limitations to current network technologies. The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method of routing network traffic. The method may include routing traffic from a local network device, through a remote network location, to a third party network resource along a first path. The method may also include determining a first ranking for the first path, and determining a second ranking for a second path from the local network device to the third party network resource along a second path, the second path excluding the remote network location. The method may additionally include, based on the second ranking exceeding the first ranking by a threshold amount, rerouting the traffic along the second path.

One or more embodiments of the present disclosure may include a method that includes receiving a domain name system (DNS) query at a network device, where the DNS query may be associated with a traffic flow identified for rerouting through an alternative path utilizing an alternative network device instead of a default path. The method may also include rewriting the DNS query such that the DNS query is routed through the alternative network device along the alternative path and to a DNS server associated with the alternative path. The method may additionally include receiving a DNS response from the DNS server, where a resource identified in the DNS response may be based on the DNS query coming through the alternative network device.

One or more embodiments of the present disclosure may include a method that includes identifying an address within a packet of a traffic flow associated with a network device. The method may also include comparing the address within the packet with a stored address, the stored address associated with a route for an alternative traffic path, where the alternative traffic path may be different from a default route of traffic passing through the network device. The method may additionally include, based on the address within the packet matching the stored address, routing the packet along the alternative traffic path instead of the default route of traffic.

One or more embodiments of the present disclosure may include a method that includes selecting a destination of a traffic flow in a second network domain outside of a first network domain, and determining multiple paths from an origin of the traffic flow to the destination, where each of the multiple paths may include a first network domain path through the first network domain and a second network domain path through the second network domain. The method may also include, for each of the multiple paths, combining a first performance score for the first network domain path with a second performance score for the second network domain path. The method may additionally include selecting one of the plurality of paths with a combined first and second performance score below a threshold, and routing the traffic flow along the selected one of the plurality of paths.

One or more embodiments of the present disclosure may additionally include systems and/or non-transitory computer readable media for facilitating the performance of such methods. The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
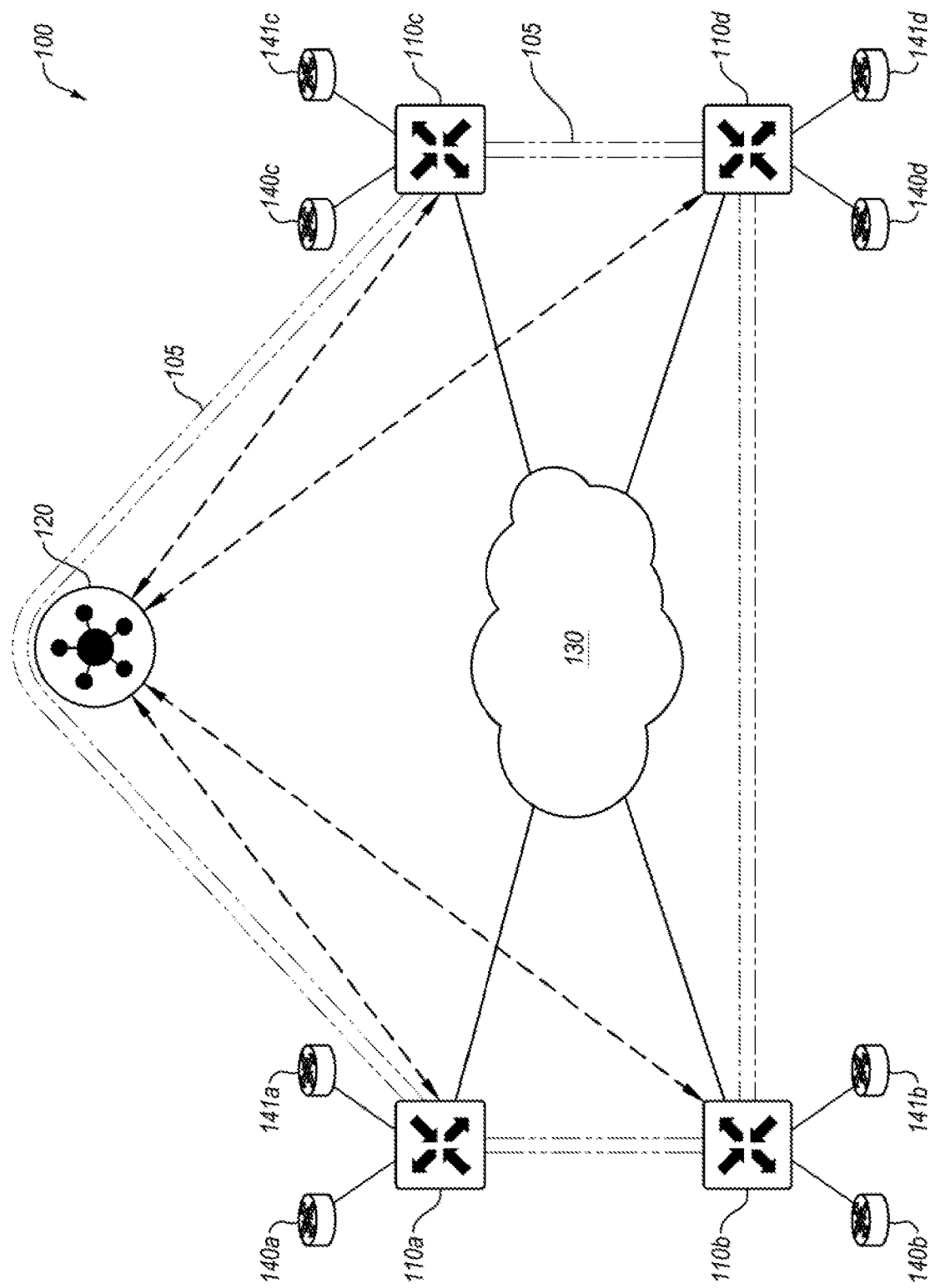
FIG. 1 illustrates an example system of network components implementing a software-defined network.

Some embodiments of the present disclosure relate to improvements to the operation of networks, and routing of network traffic. For example, a default path within a software defined network for an organization may route traffic to a core location, such as a data center, before routing network traffic for the organization outside of an internal network domain for the organization. However, the organization may include one or more alternative paths to access outside of the internal network domain aside from the default path through the core location. Furthermore, routing the traffic along such alternative paths may allow the traffic flows to access third party resources in a more efficient manner. For example, if the data center is in Boston, Mass. and an origin of a traffic flow for a third party resource is in Spokane, Wash., a data request along the default path may access third party resources proximate the data center in Boston, Mass. rather than proximate the origin in Spokane, Wash. Embodiments of the present disclosure may facilitate the use of a path with superior performance (such as through an alternative exit from the internal network domain proximate the origin in Spokane, Wash. rather than Boston, Mass.). Some embodiments of the present disclosure monitor the various paths that exit the internal network domain, and may route flows designated as rerouting flows along paths with performance superior to the default path. For example, some applications that access third party resources external to the internal network domain may be designated as rerouting applications and traffic flows of that application may be routed along a path with a superior performance.

One or more embodiments of the present disclosure may be include solutions to problems associated with rerouting traffic flows within the internal network domain. One such problem is the rerouting of domain name system (DNS) queries based on the rerouting path instead of the default path. For example, the organization may operate a dedicated DNS server and/or computing systems of the organization may expect DNS responses to come from the dedicated DNS server. However, the dedicated DNS server may be located in the data center. One or more embodiments of the present disclosure may monitor for DNS queries of rerouting applications and may rewrite the DNS queries such that the destination address is for a DNS server (such as a public DNS server) after exiting the internal network domain along the rerouted path rather than the dedicated DNS server. One or more embodiments of the present disclosure may optionally rewrite a corresponding DNS response such that the DNS response appears to have come from the dedicated DNS server rather than the public DNS server.

One or more embodiments of the present disclosure may solve a problem associated with network address translation (NAT) exit points of the internal network domain. For example, if a transmission control protocol (TCP) session is established along the default path, and then after establishing the session, the traffic flow is recognized as a rerouting flow and rerouted along the rerouting path, packets at the destination may be rejected as the packets may begin coming from a different NAT exit point with a different source IP address. In one or more embodiments of the present disclosure, a networking device may store IP addresses of destinations for rerouting flows such that when a new TCP session is attempting to be established, if it is for a rerouting flow, the TCP session will be established along the rerouting path such that the packets will come from the NAT exit point of the rerouting path. One or more embodiments of the present disclosure may facilitate the identification of which path should be used as a rerouting path. For example, the performance of a path within the internal network domain may be combined with the performance of a path outside of the internal network domain such that an end-to-end path performance may be determined for potential rerouting paths. Based on the combined performances, a network device may select which path a rerouting flow may be routed along.

Embodiments of the present disclosure may provide improvements to computer networks and to the operation of computers themselves. For example, using one or more embodiments of the present disclosure, network traffic may flow with increased performance preserving valuable network resources such as bandwidth and providing increased response times. Additionally, the amount of traffic flowing through the internal network domain may be reduced, providing superior performance for the internal network domain. As another example, path availability may be guaranteed for a rerouted path, which may improve reliability for important applications. As an additional example, the performance of applications utilizing third party resources may be improved because a path with an optimal or improved performance may be used for the application, allowing for increased response times, increased data throughput per unit time, among others.

Embodiments of the present disclosure are explained with reference to the accompanying drawings.

FIG. 1 illustrates an example system 100 of network components implementing a software-defined network, in accordance with one or more embodiments of the present disclosure. The system 100 may include an internal network domain 105 and one or more external network domains. The system 100 may include one or more edge network devices 110 (such as the edge network devices 110a-110d), a control device 120, a communication network 130, and external network devices 140 and 141 (such as the external network devices 140a-140d and 141a-141d).

The system 100 may implement a software-defined network. A software-defined network may include a network that is managed by software rather than controlled by hardware. As such, a software-defined network may support multiple types of connections, such as the Internet, Multi-Protocol Label Switching (MPLS) connections, and/or cellular connections (such as Long Term Evolution (LTE), LTE Advanced, Worldwide Interoperability for Microwave Access (WiMAX), 4G, and/or others). Additionally, a software-defined network may support load balancing or load sharing between the various connections. Further, because of the distributed nature of a network, a software defined network may support virtual private networks (VPNs), firewalls, and other security services. In a software-defined network, for example, a control plane may be functionally separated from the physical topology. In some embodiments, a software-defined network may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, a software-defined network may be implemented as a software-defined wide area network (SD-WAN), local area network (LAN), metropolitan area network (MAN), among others. While one or more embodiments of the present disclosure may be described in the context of an SD-WAN, such embodiments may also be implemented in any software-defined network.

In some embodiments, the control device 120 may be configured to manage the control plane of an internal network domain 105 by directing one or more aspects of the operation of the edge network devices 110. For example, the control device 120 may generate and/or distribute policies to one or more of the edge network devices 110. A policy may include a rule or set of rules bearing on the handling of network traffic, such as routing, priority, media, etc. The internal network domain 105 may operate as a secured and controlled domain with specific functionality and/or protocols. In some embodiments, the edge network devices 110 may operate based on one or more policies created and/or propagated by the control device 120. In these and other embodiments, the edge network devices 110 may route data traffic within the internal network domain 105 based on the policies created and/or propagated by the control device 120.

In some embodiments, the control device 120 may form a control plane connection with each of the edge network devices 110. The control plane connection may facilitate the exchange of management data between the edge network devices 110 and the control device 120 for management and control of the internal network domain 105. The control plane connection may operate as a tunnel through the communication network 130, such as a Datagram Transport Layer Security (DTLS) tunnel. In some embodiments, data transmitted over the control plane connection may facilitate the control device 120 determining topology of the communication network 130. For example, the control device 120 may communicate with the edge network devices 110 to determine what physical connections exist between and among the edge network devices 110 in the communication network 130. Additionally or alternatively, data transmitted over the control plane connection may facilitate the control device 120 determining optimal or desired paths across the communication network 130 between and among the edge network devices 110. Additionally or alternatively, the control device 120 may communicate route information to the edge network devices 110 over the control plane connection. In these and other embodiments, the control plane connection may include a permanent connection between the control device 120 and the edge network devices 110 such that if the connection between the control device 120 and a given edge network device 110 is broken, the edge network device 110 may be unable or otherwise disallowed from communicating over the internal network domain 105.

In some embodiments, the control device 120 may maintain a central route table that stores route information within the internal network domain 105. For example, the control device 120 may communicate with various edge network devices 110 to determine the physical connections available to the edge network devices 110 through the communication network 130. In some embodiments, the edge network devices 110 may include one or more physical connections to each other. In these and other embodiments, the control device 120 may generate and/or update one or more policies in conjunction with the central route table to determine data traffic routes through the internal network domain 105, and may communicate those data traffic routes to the edge network devices 110. In at least one embodiment, the control device 120 may provide policies and other categorical rules related to traffic flows to the edge network devices 110 rather than being involved with every individual flow through the internal network domain 105.

In these and other embodiments, the edge network devices 110 may not have stored the topology and/or route paths of the entire system 100. Each of the edge network devices 110 may not need to query each other individually to determine reachability. Instead, the control device 120 may provide such information to the edge network devices 110. Additionally or alternatively, a subset of the reachability and/or infrastructure information may be provided to the edge network devices 110, for example, based on one or more policies of the control device 120. In these and other embodiments, the control device 120 may route traffic through a most direct route, or through some other route based on one or more other policies of the control device 120.

In some embodiments, the one or more policies may include guidance regarding determining next-hop instructions. For example, a particular policy may instruct a particular edge network device 110 where to route the traffic next for a particular category, class, or group of traffic flows, rather than providing a complete end-to-end route for the traffic. For example, the edge network device 110a may receive data from an external network device 140a directed to an address of the external network device 141c. The edge network device 110a may have stored a first policy that includes a first traffic data route from the control device 120 indicating that a "next-hop" for network traffic destined for the address of the external network device 141c is to be routed to the edge network device 110d. The first traffic data route may indicate what connection or connections the edge network device 110a may use to route the traffic to the edge network device 110d. The edge network device 110d may have stored a second policy that includes a second traffic data route from the control device 120 indicating that a "next-hop" for network traffic destined for the address of the external network device 141c may be routed to the edge network device 110c. The second traffic data route may indicate what connection or connections the edge network device 110d may use to route the traffic to the edge network device 110c. The edge network device 110c may receive the data and may route the data to the external network device 141c with or without using a policy to arrive at this routing decision.

In addition to generating policies to guide the edge network devices 110 in making routing decisions, the control device 120 may generate policies that are to be followed by the edge network devices 110. In some embodiments, the control device 120 may generate policies to cause certain network traffic flows within the internal network domain 105 to be routed over certain types of connections (e.g., LTE, MPLS) and/or through certain edge network devices 110. For example, the control device 120 may check the central route table and determine that a direct connection exists between the edge network device 110a and the edge network device 110c. Rather than allowing data to be routed directly between the edge network device 110a and the edge network device 110c, the control device 120 may generate a policy to instead cause the data to be routed through the edge network device 110d. For example, the data may be routed through the edge network device 110d for various reasons, such as because the edge network device 110d may include a firewall, data filter, security feature, data loss prevention (DLP) feature, export control, or government compliance feature, among others. As another example, the control device 120 may generate a policy to cause one or more of the edge network devices 110 to route traffic through an edge network device 110 associated with a data center, for example, because the data center includes a firewall, data filter, etc. Using such an approach, the flow of traffic within the internal network domain 105 may be readily controlled and guided based on policies and traffic routes propagated by the control device 120 to the edge network devices 110.

In some embodiments, the control device 120 may receive one or more keys from the edge network devices 110 used in communication of data over the data plane. For example, one or more data packets may utilize one or more keys for security purposes in transmitting data from one edge network device 110 to another edge network device 110. In these and other embodiments, the control device 120 may reflect the received keys to one or more other edge network devices 110 that may be in the traffic flow based on the central route table and/or the policies implemented by the control device 120. For example, the control device 120 may receive a key from a given edge network device 110 and may rebroadcast or otherwise transmit the key to the other edge network devices 110. In these and other embodiments, a given edge network device 110 may generate symmetrical keys to facilitate secure communication between edge network devices. In these and other embodiments, a symmetrical key may be generated by the given edge network device 110, with one copy remaining with the given edge network device 110 and another copy provided to the control device 120 such that the control device 120 may distribute the symmetrical key to other edge network devices that communicate with the given edge network device 110. In such a way, each edge network device that is to communicate with the given edge network device 110 based on the policies of the control device 120 may receive the symmetrical key.

In some embodiments, traffic within the internal network domain 105 may be encrypted with an encryption scheme, such as various encryption standards or keys. For example, the internal network domain 105 may utilize two-way authentication using a public key that is sent with a certificate. Such an approach may utilize RSA-2048 or Diffie-Hellman. As another example, Datagram Transport Layer Security (DTLS) and/or Transport Layer Security (TLS) connections between edge network devices 110 may be encrypted using Advanced Encryption Standard (AES) with a 256-bit length key.

In some embodiments, the control device 120 may store authentication information for one or more (or all) of the edge network devices 110 within the internal network domain 105. In these and other embodiments, a device may be prevented from communicating within the internal network domain 105 unless the device has authentication information that matches or otherwise corresponds to the stored authentication information of the control device 120. In some embodiments, the authentication information may be used when the edge network devices 110 first come on line to establish the control plane connection, and any device without a control plane connection with the control device 120 may be prevented from communicating within the internal network domain 105.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. For example, the edge network devices 110 may be connected to the external network device(s) 140 and/or 141.

In some embodiments, the edge network devices 110 may operate to route traffic from associated external network devices 140 and 141 into the internal network domain 105. Additionally or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), and Bi-directional Forwarding Detection (BFD), among others. Additionally or alternatively, the edge network devices 110 may support other network functionalities such as Virtual Local Area Network (VLAN) tagging, Quality of Service (QoS) monitoring, Service Level Agreements (SLA), Internet Protocol (IP) forwarding, Internet Protocol Security (IPsec), Access Control Lists (ACL), among others.

For example, with VLAN tagging, the edge network devices 110 may be configured to insert a VLAN tag into a packet header. Such a VLAN tag may identify one VLAN of multiple VLANs to which a network traffic packet belongs. Based on the VLAN tag, the edge network devices 110 may route the network traffic packet to one or more port(s) associated with the VLAN.

As another example, with QoS monitoring, the edge network devices 110 may provide for one or more QoS metrics that may be monitored, such as jitter, bandwidth, error rate, bit rate, throughput, and/or others.

As an additional example, with SLAs, the edge network devices 110 may include an agreed upon threshold level for one or more QoS metrics, such as bandwidth, availability, jitter, and/or others. In these and other embodiments, a given edge network device 110 may be configured to adjust or otherwise modify one or more properties of how the given edge network device 110 handles or routes traffic to better comply with one or more SLAs. For example, the traffic flow for one application may be throttled so that the traffic flow for another application may comply with a corresponding SLA.

As another example, with IP forwarding, the edge network devices 110 may include one or more protocols that may be utilized to route packets in an IP network. For example, such a protocol may take into account factors such as packet size, services specified by a header, characteristics of potential links to other routers in the network, and/or others. Utilizing such factors, the edge network devices 110 may forward packets based on a selected algorithm, such as a shortest path.

As an additional example, with IPsec, the edge network devices 110 may utilize IPsec to authenticate and/or encrypt network traffic. For example, a given edge network device 110 may authenticate one or more computing devices to communicate with the given edge network device 110 and/or encrypt one or more packets communicated between the computing device and the given edge network device 110.

As another example, with ACLs, the edge network devices 110 may include a set of rules indicative of one or more addresses, hosts, and/or networks that may be permitted to use a given port. In these and other embodiments, the edge network devices 110 may include ACLs that are applicable to inbound traffic, outbound traffic, or both.

In some embodiments, the edge network devices 110 may locally maintain one or more local route tables. In some embodiments, the edge network devices 110 may adjust or modify the local route tables based on one or more policies sent from the control device 120. For example, one or more entries may be removed, discarded, or otherwise not added to the local route tables by the edge network devices 110 based on the one or more policies. In some embodiments, the edge network devices 110 may include logic to update, modify, and/or generate the local route tables based on traffic handled by the edge network devices 110. The one or more local route tables may be automatically populated by the edge network devices 110 based on direct interface routes, static routes, and/or dynamic routes learned using one or more network protocols such as BGP and/or OSPF. In some embodiments, routing decisions for data outside of the internal network domain 105 may be performed by a particular edge network device 110 without specific direction, input, or control from the control device 120. For example, the particular edge network device 110 may compute a routing decision based on the one or more policies that the particular edge network device 110 has received from the control device 120 and/or with reference to the local route table of the particular edge network device 110.

In some embodiments, by separating the routing decisions for data outside of the internal network domain 105 from those within the internal network domain 105, the system 100 may include multiple segments that may be handled based on the policies from the control device 120. In these and other embodiments, the multiple segments may correspond to multiple VPNs that may be handled separately using the same internal network domain 105.

For example, an accounting department may include one VPN and the rest of an organization may be on another VPN. As another example, an original business entity may be on one VPN and a business entity newly acquired by the original business entity may be on a separate VPN. For example, the external network devices 140a-140d may be in a first VPN with a first prefix that may identify data packets associated with the first VPN, and the external network devices 141a-141d may be in a second VPN with a second prefix associated with the second VPN. In these and other embodiments, a given edge network device 110 may provide any prefixes learned by the given edge network device 110 to the control device 120. For example, the edge network device 110a may query, learn, or otherwise obtain the first prefix of the first VPN associated with the external network device 140a and the second prefix of the second VPN associated with the external network device 141a. The edge network device 110a may transmit the first and the second prefixes to the control device 120. In these and other embodiments, the control device 120 may provide received prefixes to one or more of the edge network devices 110. For example, the prefixes received from the edge network device 110a may be communicated from the control device 120 to the edge network devices 110b-110d.

In some embodiments, one or more of the edge network devices 110 and/or the control device 120 may be implemented as one or more virtual machines operating on one or more physical computing devices. Additionally or alternatively, the edge network devices 110 and/or the control device 120 may each include an individual stand-alone computing device. Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
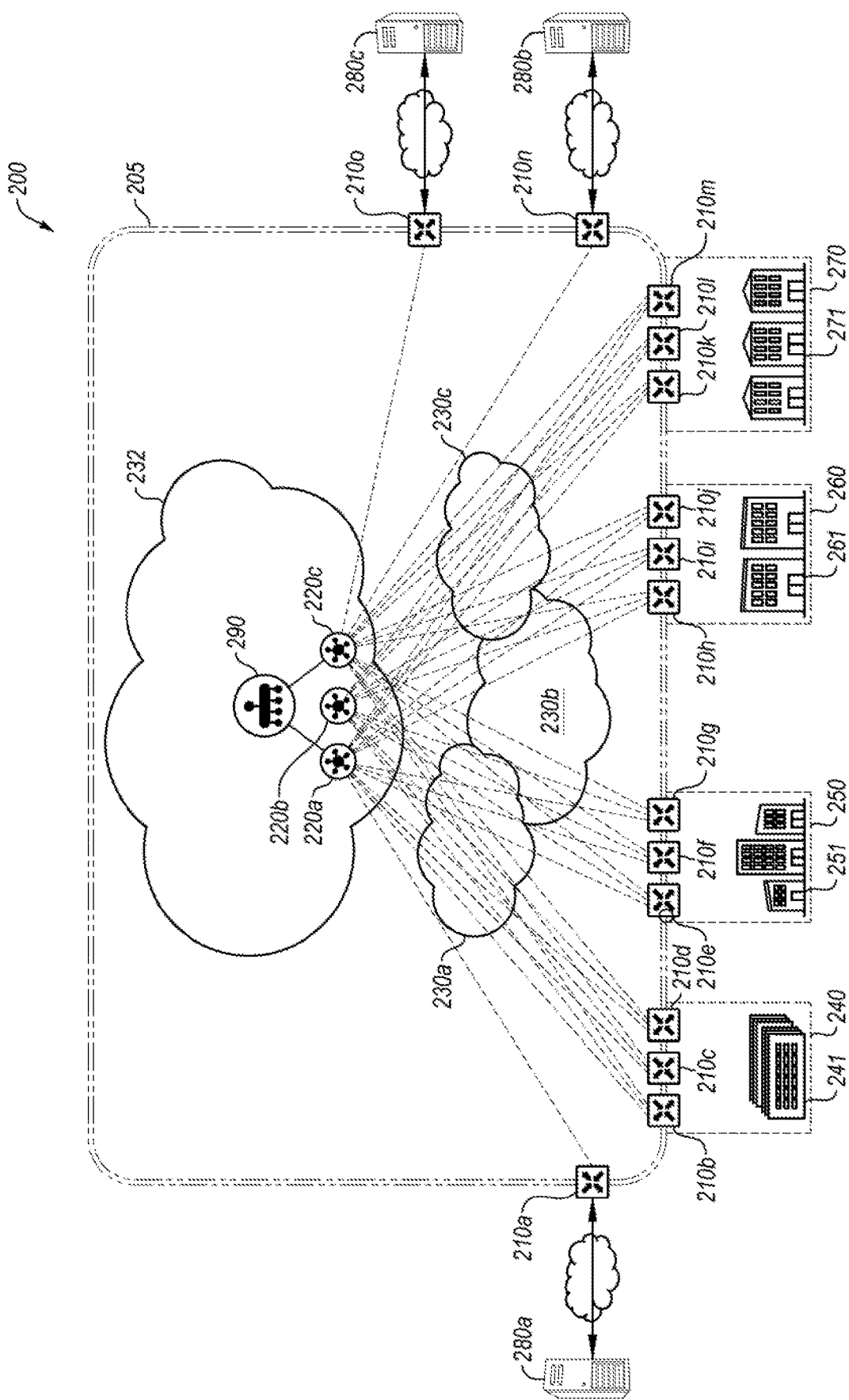
FIG. 2 illustrates another example system implementing a software-defined network.

FIG. 2 illustrates another example system 200 of network components implementing a software-defined network, in accordance with one or more embodiments of the present disclosure. The system 200 may include one or more edge network devices 210 (such as the edge network devices 210a-210o), one or more control devices 220 (such as the control devices 220a, 220b, and 220c), and one or more communication networks 230 (such as the communication networks 230a, 230b, and 230c). The edge network devices 210 may be similar or comparable to the edge network devices 110 of FIG. 1, the control devices 220 may be similar or comparable to the control device 120 of FIG. 1, and the communication networks 230 may be similar or comparable to the communication network 130 of FIG. 1. The system 200 may be a similar or comparable system to the system 100 of FIG. 1, although expanded to include additional network components and additional external network domains. The system 200 may include an internal network domain 205 in and between the edge network devices 210, in a similar or comparable manner to that described with respect to the system 100 of FIG. 1. The system 200 additionally may include multiple external network domains. For example, a data center 240 may represent a first external network domain, a campus 250 may represent a second external network domain, a branch 260 may represent a third external network domain, and a remote site 270 may represent a fourth external network domain. In these and other embodiments, each external network domain may include one or more edge network devices 210 acting as a bridge between the internal network domain 205 and the given external network domain. Additionally or alternatively, one or more of the external network domains may functionally operate as being accessible from the other external network domains as though in a single network by being communicatively coupled through the internal network domain 205.

In some embodiments, the system 200 may include one or more external resources 280 (such as the external resources 280a-280c). The external resources 280 may be operated by the same entity or organization that operates the internal network domain 205, or may be operated by a different entity. In these and other embodiments, the system 200 may include an edge network device 210 that may be associated with a particular external resource 280. For example, the system 200 may include an edge network device 210 located within a regional co-location facility. A regional co-location facility may include a location with directed or guaranteed access to the Internet or other communication protocols at a given physical location. In some embodiments, a regional co-location facility may include a prioritized or improved connection to one or more of the external resources 280. In some embodiments, the regional co-location facility may be at a designated geographical location that may be physically proximate one or more of the external network domains. For example, the data center 240 may be located in New York, and the branch 260 may be located in Dallas Tex., and the edge network device 210n may be in a regional co-location facility in Houston, Tex.

The external resources 280 may include any computing service available for consumption by the system 200. For example, the external resources 280 may include a cloud-based service such as a software subscription or software as a service (SaaS) (such as Microsoft Office 365®, Azure®, Google Apps®, Workforce®, Amazon Web Services®, WorkDay®, DocuSign®, GoToMeeting®, WebEx®, QuickBooks®, and/or others), media services (such as YouTube®, NetFlix®, Pandora®, Spotify®, and/or others), and/or others. In these and other embodiments, the external resources 280 may include a third party network to facilitate access to the external resource 280 with one or more access points at various geographical locations. For example, a SaaS may include an access server in Austin, Tex.; Palo Alto, Calif.; and New York, N.Y. for accessing the third party network. In some embodiments, the system 200 may be geographically distributed. For example, the data center 240 may be located in St. Paul, Minn.; the campus 250 may be located in Des Moines, Iowa; there may be branches 260 in Seattle, Wash.; Los Angeles, Calif.; Atlanta, Ga.; and Orlando, Fla.; and there may be remote sites 270 in London, England; Berlin, Germany; and Seoul, Korea. In these and other embodiments, the system 200 may utilize the communication networks 230 and the internal network domain 205 to facilitate communication between all of these distributed physical locations as a single network.

In some embodiments, one or more of the external network domains may use one or more applications with resources in the data center 240, such as Microsoft Exchange®, SharePoint®, Oracle e-Business Suite®, and/or others. For example, a workstation operating at the campus 250 may operate Microsoft Exchange®. The operation of the application may include a data flow that goes from the workstation to the edge network device 210e in the external network domain of the campus 250. The data flow may go from the edge network device 210e to one of the edge network devices 210b, 210c, and/or 210d associated with the data center 240 through the internal network domain 205. The one of the edge network devices 210b, 210c, and/or 210d may route the traffic to the Microsoft Exchange® server in the external network domain of the data center 240. Additionally or alternatively, the operation of the application may include a data flow in the reverse order of data flowing from the Microsoft Exchange® server to the workstation.

In some embodiments, the system 200 may include a network management device 290 that may communicate with the control devices 220 over a management network 232. The network management device 290 may provide management and control of one or more devices associated with the internal network domain 205, including the edge network devices 210, the control devices 220, and/or others. For example, the network management device 290 may provide a graphical user interface (GUI) that provides a network administrator with access to control or observe operation of the internal network domain 205. In some embodiments, the network administrator may input policies via the network management device 290 that may be communicated to the control devices 220 for implementation via the edge network devices 210. In some embodiments, the network management device 290 may provide a GUI dashboard with a visual and/or textual description of one or more properties of the internal network domain 205, such as a number and/or status and/or health of edge network devices 210, a number and/or status of control devices 220, a number of and/or last time of reboot, transport health (such as loss, latency, and/or jitter), a number of sites that are operating or not operating, application consumption of network resources, application routing, and/or others.

In some embodiments, the network management device 290 may be configured to recognize approved edge network devices 210 and/or control devices 220. For example, the network management device 290 may maintain a list of serial numbers, MAC addresses, or other uniquely identifying information for the edge network devices 210 and/or the control devices 220. In these and other embodiments, communication in the internal network domain 205 may be restricted to edge network devices 210 and/or control devices 220 with identifying information on the list maintained by the network management device 290.

In some embodiments, the network management device 290 may be configured to generate and/or store configurations of one or more edge network devices 210 and/or control devices 220. For example, a network administrator may use the network management device 290 to configure a particular edge network device 210 and may store that configuration as a template that may be applied to future edge network devices. Additionally or alternatively, a template for the edge network devices 210 may be provided by a third party and applied to a new edge network device 210. In these and other embodiments, a template for the control devices 220 may be generated, stored, and/or applied to a new control device 220. Additionally or alternatively, such a template may be used to automatically configure a newly deployed edge network device 210. For example, the newly deployed edge network device 210 may be brought online and connected to a corresponding control device 220. The corresponding control device 220 may verify the serial number of the edge network device 210 with the network management device 290, and may obtain a template from the network management device 290 for the edge network device 210. The control device 220 may send the template to the edge network device 210 to be automatically installed to configure the edge network device 210 according to the template.

In some embodiments, the network management device 290 may be implemented as a physical device or a virtualized machine. In these and other embodiments, the network management device 290 may be physically located proximate a centralized location, such as within the data center 240 or at the campus 250.

Modifications, additions, or omissions may be made to FIG. 2 without departing from the scope of the present disclosure. For example, while illustrated as including a certain number of edge network devices 210 and external network domains, the system 200 may include any number of edge network devices 210 and external network domains.

Figure 3:
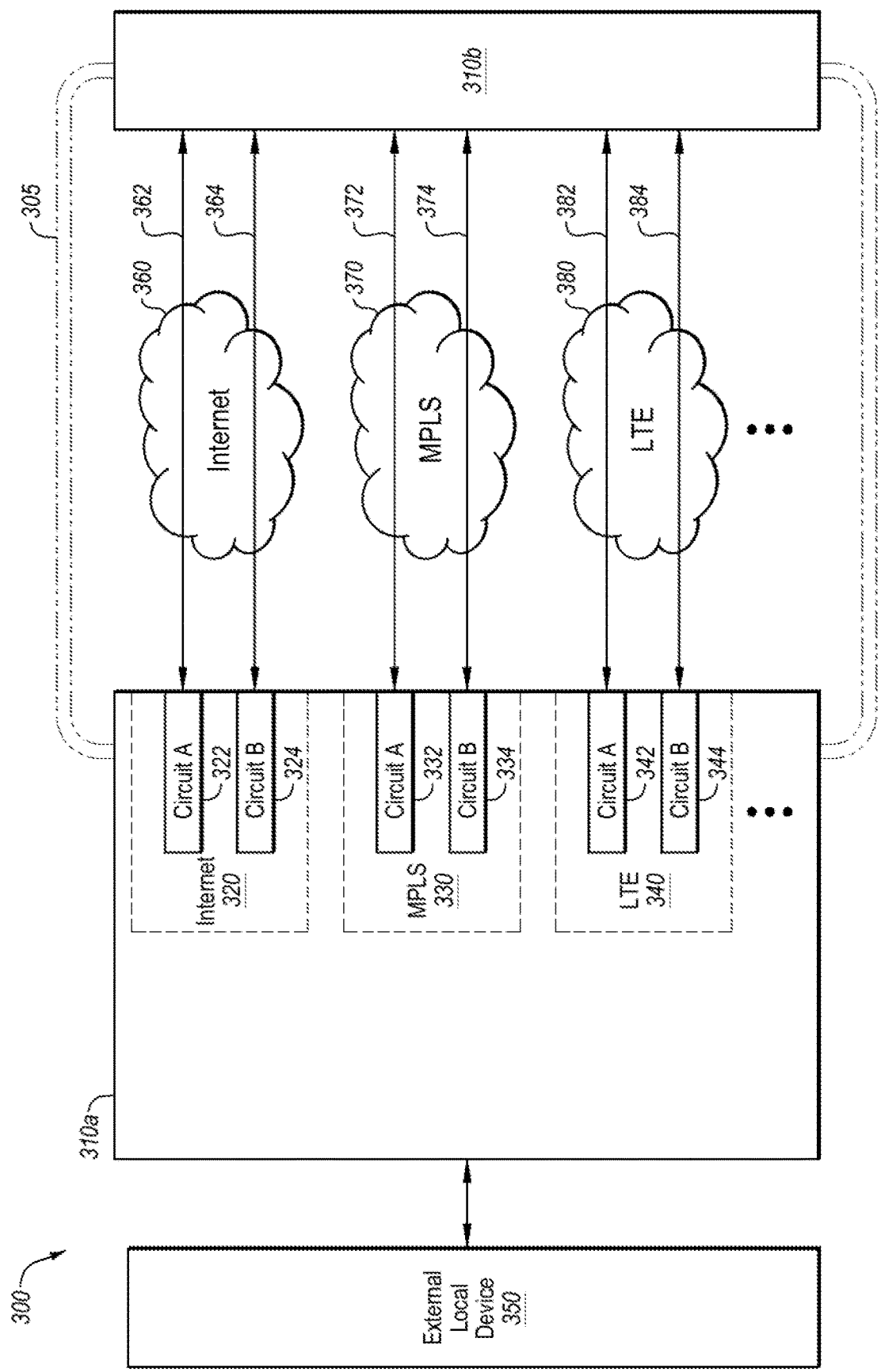
FIG. 3 illustrates an additional example system as part of a software-defined network.

FIG. 3 illustrates an additional example system 300, in accordance with one or more embodiments of the present disclosure. FIG. 3 illustrates an edge network device 310a that may include multiple potential connections for communicating across an internal network domain 305 to another edge network device 310b. For example, the edge network device 310a may communicate across the internal network domain 305 using the Internet 360, an MPLS network 370, and/or an LTE network 380. The edge network devices 310a and 310b may be similar or comparable to the edge network device 110 of FIG. 1 and/or the edge network devices 210a-210o of FIG. 2. The system 300 may additionally include an external local device 350 that may be communicatively coupled to the edge network device 310a across an external network domain.

In some embodiments, the edge network device 310a may include an Internet connection 320, an MPLS connection 330, and an LTE connection 340. As illustrated by the ellipses below the LTE connection 340, any number of additional or other potential connections may also be included. In these and other embodiments, the edge network device 310a may include multiple circuits for connecting to the one or more potential connections. For example, the edge network device 310a may include a circuit A 322 and a circuit B 324 for the Internet connection 320, a circuit A 332 and a circuit B 334 for the MPLS connection 330, and a circuit A 342 and a circuit B 344 for the LTE connection 340. In these and other embodiments, the edge network device 310a may be configured to route traffic along one or more of the circuits, based on one or more policies stored by the edge network device 310a. In some embodiments, the edge network device 310a may be configured to monitor one or more properties of the various connections. For example, the edge network device 310a may monitor the jitter, latency, loss, and/or bandwidth of the various communication links from the edge network device 310a to the edge network device 310b. In these and other embodiments, the edge network device 310a may also monitor and/or store security properties of the various communication links. For example, links 362 and 364 over the Internet 360 may be considered at a first level of security, and links 372 and 374 over the MPLS network 370 may be considered at a second level of security higher than the first level of security. In some embodiments, the edge network device 310a may route traffic for one or more applications to specific circuits based on one or more policies and/or based on one or more properties of the various connections. For example, a video application may be particularly susceptible to jitter. The edge network device 310a may determine that the video traffic may be travelling across the link 382 with a jitter of 10 ms, and that the link 362 may have a jitter of 4 ms. The edge network device 310a may shift the traffic for the video application to the link 362 rather than the link 382 because of the lower jitter. In some embodiments, shifting from the link 382 to the link 362 may be based on a jitter-based SLA. As another example, the edge network device 310a may receive a data flow for a security-sensitive application (such as an accounting application) and may have a policy that data for that application is to be routed along one of the MPLS links 372 and/or 374, even if other traffic may be routed along the Internet link 362. As an additional example, the edge network device 310a may include an SLA that a given application have a bandwidth of 10 MB/s available to the application. The edge network device 310a may make the link 362 over the Internet 360 available to the application, but the link 362 may provide 5 MB/s of bandwidth. The edge network device 310a may also provide the links 382 and 384 to the application such that the overall combined bandwidth of the links 362, 382, and 384 exceed the bandwidth agreement of the SLA. In these and other embodiments, the edge network device 310a may be configured to perform such routing based on initially receiving a data flow, during an on-going data flow, based on a triggering event of the data flow, and/or others or combinations thereof. Additionally or alternatively, such routing may combine multiple links of multiple types of connections for a single flow in routing traffic flows.

In some embodiments, the edge network device 310a may be configured to route traffic to the various links based on the source of the traffic. For example, one or more policies may indicate that traffic from one corporate department of a business is routed along the MPLS connection 330, while traffic for another corporate department may be routed along any link. In some embodiments, the edge network device 310a may be implemented as a computing system, such as the computing system 1100 illustrated in FIG. 11.

Modifications, additions, or omissions may be made to FIG. 3 without departing from the scope of the present disclosure. For example, while illustrated as including a certain number of edge network devices 310, the system 300 may include any number of edge network devices 310. As another example, while illustrated as including three communication networks (the Internet 360, the MPLS-based network 370, and the LTE network 380) any number of communication networks may be utilized.

Figure 4:
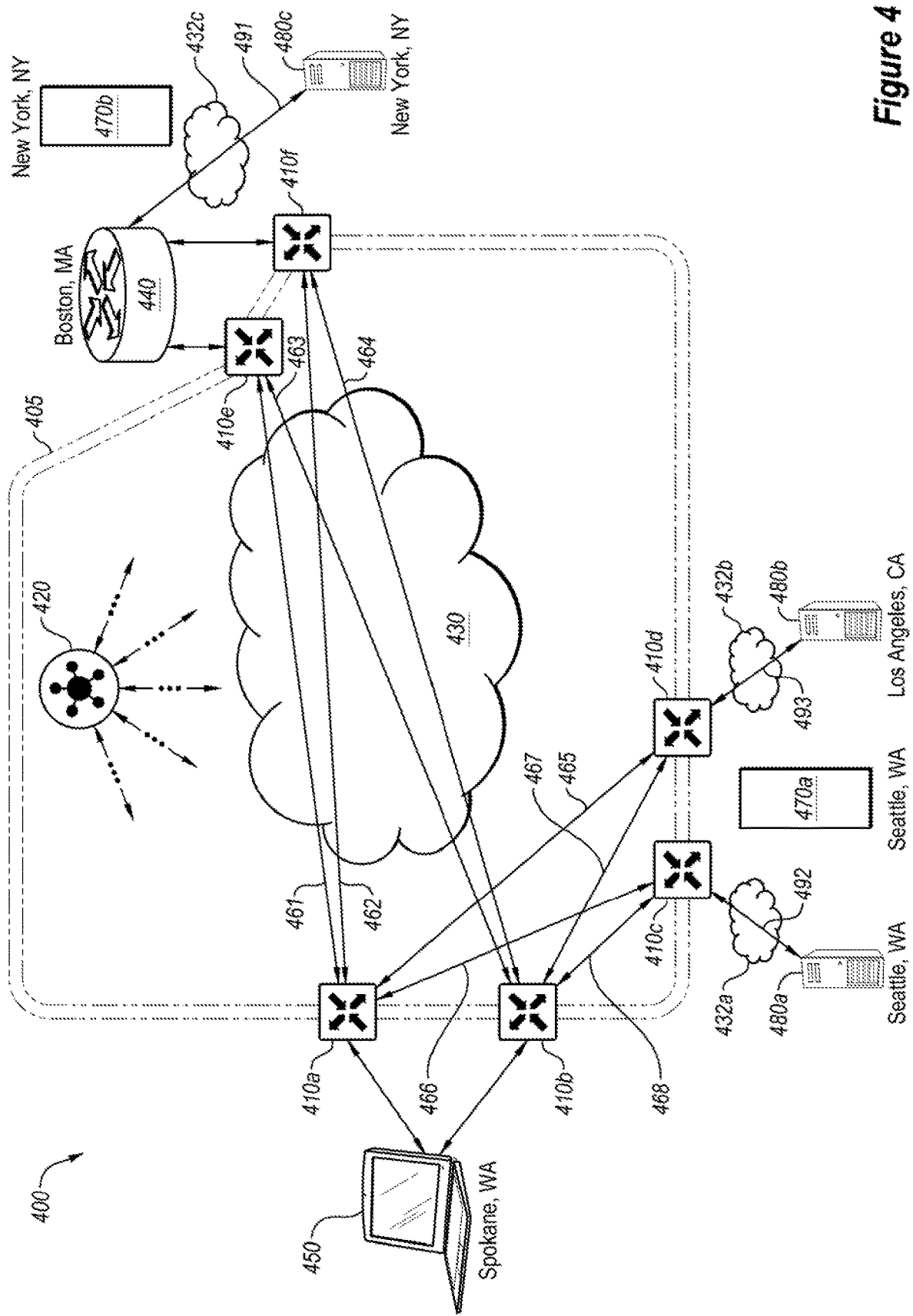
FIG. 4 illustrates another example system implementing a software-defined network.

FIG. 4 illustrates another example system 400 implementing a software-defined network, in accordance with one or more embodiments of the present disclosure. The system 400 may include one or more edge network devices 410 (such as the edge network devices 410a-410f), which may be similar or comparable to the edge network devices 110 of FIG. 1, 210 of FIG. 2, and/or 310 of FIG. 3. In some embodiments, one or more of the edge network devices 410 may be clustered, such as the edge network devices 410a and 410b. The system 400 may also include one or more control devices 420, which may be similar or comparable to the control device 120 of FIG. 1, and/or 220 of FIG. 2. The system 400 may additionally include one or more communication networks 430 and/or 432 (such as the communication networks 432a-432c), which may be similar or comparable to the communication network 130 of FIG. 1, 230 of FIG. 2, and/or the combination of any of the Internet 360, the MPLS network 370, and the LTE network 380 of FIG. 3. The system may additionally include a data center 440, which may be similar or comparable to the data center 240 of FIG. 2. The system may also include one or more third party resources 480 (such as the third party resources 480a-480c), which may be similar or comparable to the third party resources 280a-c of FIG. 2. For the purposes of discussing FIG. 4, the third party resources 480a-480c may serve the same third party resource and may represent distinct servers for accessing the third party resource. For example, the third party resource 480a may include a server for accessing a cloud based service in Seattle, Wash., the third party resource 480b may include a server for accessing the cloud based service in Los Angeles, Calif., and the third party resource 480c may include a server for accessing the cloud based service in New York, N.Y. In these and other embodiments, the system 400 may include a local computing device 450, one or more paths through an internal network domain 405 (such as the paths 461-468), one or more paths through an external network domain (such as the paths 491-493), and one or more DNS servers 470 (such as the DNS servers 470a and 470b). In some embodiments the DNS server 470b may include an internal DNS server associated with the data center 440, or may include a public DNS server.

In operation, the system 400 may include the internal network domain 405 similar or comparable to the internal network domains 105, 205, and/or 305 described with reference to FIGS. 1-3, such as between and among the edge network devices 410 and including the control device 420. In some embodiments, the system 400 may utilize a default path such that traffic being routed from within the internal network domain 405 to outside of the internal network domain 405, such traffic may be routed through the data center 440. For example, the control device 420 may include a policy or other routing instructions which indicate that, by default, traffic in the internal network domain 405 that will exit to an external network domain such as the Internet, is to be routed through the data center 440. For example, data from the local computing device 450 may be routed over one of the paths 461-464 to one of the edge network devices 410e and/or 410f and to the data center 440. In these and other embodiments, the local computing device 450 may be located some physical distance from the data center 440. For example, the local computing device 450 may be located in a branch in Spokane, Wash. and the data center 440 may be located in Boston, Mass.

In some embodiments, the system 400 may include one or more edge network devices 410 at locations in closer physical proximity to the local computing device 450. For example, the edge network device 410*c* may be at a colocation facility in Seattle, Wash. and the edge network device 410*d* may be at a colocation facility in San Jose, Calif. In some embodiments, the system 400 may include multiple paths via which the local computing device 450 may access one of the third party resources 480. For example, such paths may include the path combinations of 461+491, 462+491, 463+491, 464+491, 465+493, 466+492, 467+493, and 468+492. Each of the paths may have different performance and performance metrics, such as jitter, latency, loss, and/or bandwidth. In some embodiments, the control device 420 may identify one or more applications as being rerouting applications. Rerouting applications may include an application that utilizes a third party resource and whose traffic may be routed along a path different from the default path to improve performance of the application based on the performance of the path to and from the third party resource. For example, some applications may be susceptible to performance degradation with low performance metrics from one or more of jitter, latency, loss, and/or bandwidth. In these and other embodiments, traffic of the rerouting applications may or may not be rerouted.

In some embodiments, traffic for a rerouting application may be rerouted based on the performance metric of the various paths through the system 400. For example, the local computing device 450 may reroute traffic from a default path of the path 461+491 to instead route the traffic along the paths 466+492 based on the path 466+492 including an improved performance as compared to the default path 461+491.

In some embodiments, attempting to perform such rerouting may impose specific technical problems solved by one or more embodiments of the present disclosure. For example, if a traffic flow is rerouted such that the traffic flow comes from a different origin address, a session associated with the flow may be interrupted. For example, a destination server of the flow may reject packets coming from a different origin IP address. In these and other embodiments, such rerouting may interrupt the session (such as a TCP session), such that a new session may need to be created. As another example, identifying a DNS server associated with an alternative path may prove difficult if a DNS query has already been performed for the default path. In these and other embodiments, solutions to such problems may cause a computer to perform more effectively by preserving network resources, reducing redundant traffic, and decreasing response times such that the computer functions more quickly.

DNS Queries.

In some embodiments, the local computing device 450 may include an application that uses one or more resources of the third party resource 480. In identifying a path to access the third party resource 480, the local computing device 450 may submit a DNS query. The DNS query may include a URL and a request to receive an IP address associated with the URL such that the local computing device 450 may route a request to the IP address. For example, the DNS query may be routed to a DNS server that determines what IP address is associated with the URL of the third party resource 480. The local computing device 450 may use the IP address to access the third party resource 480. For example, using the default path through the data center 440, the DNS query may be routed to a DNS server 470*b* in relative physical proximity to the data center 440 as compared to the DNS server 470*a*. For example, the DNS server 470*b* may be located in New York, N.Y. and the DNS server 470*a* may be located in Seattle, Wash. In these and other embodiments, along the default path where the local computing device 450 accesses the Internet via the data center 440 in Boston, Mass., a DNS query may be routed to the DNS server 470*b* in New York, N.Y. In these and other embodiments, the DNS response may include the IP address of the third party resource 480*c* in New York, N.Y. based on the physical proximity to the DNS server 470*b*. Such physical distance from the local computing device 450 may cause a decrease in one or more of the performance metrics of jitter, latency, loss, and/or bandwidth. In some embodiments, if the DNS query of the local computing device 450 for the third party resource 480 is coming through the edge network device 410*a*, the edge network device 410*a* may determine that the application associated with the DNS query is a rerouting application. For example, the edge network device 410*a* may compare the URL of the DNS query with a list, database, etc. of URLs of applications designated as rerouting applications. Based on the DNS query being associated with the rerouting application, the edge network device 410*a* may send the DNS query through a rerouted path. For example, rather than sending the DNS query along the path 461 to the DNS server 470*b*, the DNS query may be routed along the path 466 to the DNS server 470*a*. In these and other embodiments, based on the DNS query being received at the DNS server 470*a* instead of the DNS server 470*b*, the DNS response may indicate that traffic is to be routed to the third party resource 480*a* in Seattle, Wash. rather than the third party resource 480*c* in New York, N.Y. In such an embodiment, the third party resource 480*a* may be in closer physical proximity to the local computing device 450 than the third party resource 480*c*. Such physical proximity may provide an improvement to one or more of the performance metrics of the path between the local computing device 450 and the third party resource 480*c*.

In some embodiments, the edge network device 410*a* may identify a DNS query to be rerouted based on the DNS query including a uniform resource locator (URL) associated with a rerouting application. For example, the control device 420 may send a list of URLs associated with a rerouting application to the edge network device 410*a*. When receiving a DNS query, the edge network device 410*a* may compare the URL of the DNS query with the list of URLs associated with rerouting applications. In some embodiments, in response to determining that the URL of the DNS query is associated with a rerouting application, the edge network device 410*a* may determine the rerouted path. Additionally or alternatively, the edge network device 410*a* may determine a rerouted path for a rerouting application prior to receiving a DNS query associated with the application.

In some embodiments, one or more providers of third party resources, such as the third party that provides the third party resource 480 may periodically provide a list of URLs associated with the third party resource to the control device 420 and/or an entity associated with the control device 420. In these and other embodiments, the control device 420 may periodically provide an updated list of URLs associated with third party resources of rerouting applications to the edge network devices 410. For example, on a periodic (e.g., weekly, bi-weekly, monthly, etc.) cycle, the edge network devices 410 may obtain an updated list of URLs. Additionally or alternatively, such URL updating may be performed at irregular intervals rather than periodically, or any combination thereof.

In some embodiments, the edge network device 410*a* may rewrite the DNS query such that the DNS query may be routed through the internal network domain 405 according to the rerouted path. For example, the edge network device 410a may modify the header, payload, or other portions of the packet of the DNS query such that the DNS query is routed through the internal network domain 405 along the rerouted path rather than the default path. For example, if the DNS server 470b is an internal DNS server associated with the data center 440 (e.g., a DNS server hosted and/or operated by an organization or entity hosting and/or operating the internal network domain 405), the edge network device 410a may rewrite the destination IP address in the header to be a public IP address of a public DNS server such as the DNS server 470a rather than the internal DNS server 470b. As another example, if the DNS server 470b is an external DNS server but is located proximate the data center 440 (and/or is used by the internal network domain 405 by default to resolve DNS queries), the edge network device 410a may rewrite the destination IP address in the header of the DNS query to target the public DNS server 470a rather than the DNS server 470b.

In some embodiments, the edge network device 410a may monitor for a DNS response correlated with the rerouted DNS query. For example, the edge network device 410a may monitor for DNS responses that include a transaction identification number that is similar, the same, or otherwise correlates with a transaction identification number of the DNS query. In these and other embodiments, the edge network device 410a may rewrite the DNS response. For example, the DNS response may be modified such that the DNS response appears to have been routed along the default path and/or that the DNS response appears to have been sent from the DNS server 470b rather than the DNS server 470a. In these and other embodiments, the edge network device 410a may rewrite the DNS response by modifying the header, payload, or other fields of the DNS response packet. For example, the edge network device 410a may rewrite the return routing information in the DNS response such that the DNS response appears to have been sent from the DNS server 470b. As another example, the time to live (TTL) field may be modified to cause more frequent DNS queries.

In some embodiments, by monitoring for and modifying the DNS query and/or response, a client such as the local computing device 450 and/or a DNS server 470b may be unaware of the rerouting of the DNS query and response.

In some embodiments, a similar approach may be taken for any DNS query rerouting. For example, in circumstances in which an organization has multiple DNS servers, VPNs, proxy situations, different DNS servers for lookups across different domains, etc., a DNS query may be rerouted in accordance with the present disclosure.

NAT Exit Routing.

In some embodiments, traffic associated with a rerouting application may be routed through a particular NAT exit point. For example, with reference to FIG. 4, when a data flow is going from the local computing device 450 to the third party resource 480c, the data center 440 may provide NAT services and act as an NAT exit point from an entity operating the internal network domain 405. For example, the data center 440 may modify packets of the data flow from the local computing device 450 to the third party resource 480c such that the source IP address in the packets is changed from the IP address of the local computing device 450 to a globally unique IP address. Additionally or alternatively, one or more of the edge network devices 410 may operate as NAT exit points, such as the edge network device 410c and/or 410d.

In rerouting traffic flowing from the local computing device 450 to the third party resource 480, from a default path (e.g., through the data center 440) to a rerouted path (e.g., through the edge network devices 410c or 410d), the NAT exit point may change, for example, from the data center 440 to the edge network device 410c. In making such a transition, an interruption may be experienced in the flow as the third party resource 480 may begin receiving packets with a different source IP address (e.g., packets with the global IP address from the edge network device 410c instead of the global IP address of the data center 440) and discard such packets. In these and other embodiments, a new TCP connection may be established along the rerouted path (e.g., through the edge network device 410c as the NAT exit point) instead of the default path (e.g., through the data center 440 as the NAT exit point). In these and other embodiments, one or more of the edge network devices 410 may include a storage (e.g., a cache or other memory device) that stores one or more addresses associated with rerouting applications. For example, when the edge network device 410a receives a request to form a TCP connection with a given IP address, the edge network device 410 may compare the IP address with the stored addresses. If the address for the TCP connection matches one of the stored addresses, the edge network device 410 may route the packets to form the TCP connection along the rerouted path. For example, the edge network device 410a may receive a packet to form a TCP connection with the third party resource 480, and the IP addresses may be stored by the edge network device 410a indicating that the IP address is associated with a rerouting application to utilize the edge network device 410c as a NAT exit point. Based on the IP address matching the stored IP address, the edge network device 410a may route the packets to form the TCP connection to follow the path through the edge network device 410c to the third party resource 480a. By routing the packets through the NAT exit point associated with the rerouted path, the edge network device 410a may facilitate continued communication between the local computing device 450 and the third party resource 480.

In some embodiments, the edge network devices 410a may utilize a traffic flow analyzer such as a deep packet inspection engine to determine whether the traffic flow is associated with a rerouting application. A traffic flow analyzer may include one or more software or hardware elements of a network device configured to examine packets of a traffic flow as the traffic flow passes through the network device. A traffic flow analyzer may analyze a header, payload, or both, of packets in a data flow. Such a traffic flow analyzer may be configured to identify an application associated with the traffic flow based on the content of the packets of the traffic flow. If the traffic flow is associated with a rerouting application, the edge network device 410a may store the destination IP address of the third party resource 480 as an address associated with the rerouting application. In these and other embodiments, the stored address may be used in comparing future traffic flows such that if the future traffic flows through the edge network device 410a are directed to the stored IP address, the future traffic flows can be identified as being associated with a rerouting application from the first packets. In some embodiments, the traffic flow analyzer of the edge network device 410a may operate on flowing traffic, such as traffic after a TCP connection has been established. In some embodiments, the traffic flow may be a traffic flow along the default path (e.g., through the data center 440 as the NAT exit point) rather than the rerouted path (e.g., through the edge network device 410c as the NAT exit point). In these and other embodiments, after the traffic flow analyzer determines that a flow along the default path is associated with a rerouting application, the edge network device 410a may reroute the flow along the rerouted path. In these and other embodiments, the TCP connection may be refreshed or otherwise reestablished with the rerouted NAT exit point.

In some embodiments, the edge network device 410a may monitor DNS queries to identify IP addresses associated with rerouting applications. For example, if a DNS query flows through the edge network device 410a, the edge network device 410a may identify the URL of the DNS query as associated with a rerouting application. Based on the URL being associated with a rerouting application, the edge network device 410a may monitor or otherwise observe the DNS response that is responsive to the DNS query as the DNS response flows through the edge network device 410a. The IP address identified in the DNS response may be stored as one of the stored addresses for comparison to identify flows associated with rerouting flows. In these and other embodiments, a list of URLs associated with rerouting traffic may be obtained by the edge network device 410a. For example, the control device 420 may periodically transmit a list of URLs associated with a rerouting application such that DNS queries targeting a URL on the list may prompt the edge network device 410a to monitor for the associated DNS response.

In some embodiments, the stored addresses may be updated or discarded on a periodic basis. For example, the edge network device 410a may be configured to discard stored addresses that have not been matched with a traffic flow for a duration that exceeds a threshold. Such a duration may include twelve hours, twenty-four hours, forty-eight hours, seventy-two hours, five days, a week, a month, or longer.

Path Selection.

In some embodiments, the edge network device 410a may determine which path a traffic flow of a rerouted application will take. For example, the edge network device 410a may determine that a traffic flow is associated with a rerouting application and may select a path for the application. Additionally or alternatively, the edge network device 410a may maintain a database or other storage of a reroute path associated with a rerouting application such that when a traffic flow is determined to be associated with a rerouting application, the edge network device 410a may already have a rerouting path designated for the traffic flow.

In some embodiments, each of the edge network devices 410 may assess the performance of paths between a given edge network device 410 and the other edge network devices 410. For example, the edge network device 410a may monitor the performance of the paths 461, 462, 465, and 466; and the edge network device 410b may monitor the performance of the paths 463, 464, 467, and 468. In these and other embodiments, the edge network devices 410 may monitor one or more of jitter, latency, loss, and/or bandwidth of the various paths. For example, one or more test packets may be communicated among or between the edge network devices 410 and characteristics of the travel time and/or integrity of the test packets may be used to determine the performance metrics of the paths. Additionally or alternatively, one or more of the performance metrics may be combined into a single score reflecting the performance of the paths within the internal network domain 405. In some embodiments, such assessment may be performed based on the known availability of an application endpoint within each edge network device 410, for example, through BFD.

In some embodiments, one or more of the edge network devices 410 may communicate the determined performance metrics with one or more components of the system 400. For example, the edge network devices 410 may communicate the performance metrics to the control device 420, and the control device 420 may distribute the performance metrics to one or more of the edge network devices 410. As another example, the edge network devices 410 may communicate the performance metrics to one or more other edge network devices 410 (e.g., the edge network device 410b may communicate the performance metrics for the paths 463, 464, 467, and 468 to the edge network device 410a).

In some embodiments, one or more of the edge network devices 410 may assess the performance of paths between a given edge network device 410 and one or more connections to the third party resource 480. For example, the edge network devices 410e and/or 410f may monitor the performance of the path 491, the edge network device 410c may monitor the performance of the path 492, and the edge network device 410d may monitor the performance of the path 493. In these and other embodiments, the edge network devices 410 may monitor one or more of jitter, latency, loss, and/or bandwidth of the various paths. For example, one or more requests may be communicated from the edge network devices 410 to the third party resource 480 and characteristics of the travel time and/or integrity of the response to the request may be used to determine the performance metrics of the paths. For example, the edge network devices 410 may utilize an application layer reachability tool. In some embodiments, one or more of the performance metrics may be combined into a single score reflecting the performance of the path outside of the internal network domain 405.

In some embodiments, the edge network devices 410 may maintain a table, database, or other storage structure of the scores of the performance metrics of the various paths in the system 400. In these and other embodiments, the edge network devices 410 may utilize the stored scores to determine which path a rerouting application may utilize when rerouting a flow for a rerouting application. For example, the edge network device 410a may store a table with a single score for each of the paths in the system 400.

In some embodiments, the edge network device 410a may compare scores of the potential paths to the third party resource 480 to determine which path the rerouted traffic may flow along. For example, the edge network device 410a may compare the combined scores of the paths 461+491, 462+491, 465+493, 466+492, 467+493, and 468+492. In these and other embodiments, the edge network device 410 may determine which score represents the best performance for the traffic associated with the rerouting application.

In some embodiments, the internal network domain 405 may include multiple possible paths between two edge network devices 410. For example, the path 465 between the edge network device 410a and the edge network device 410d may represent an MPLS connection, and a second connection (not illustrated) between the edge network device 410a and the edge network device 410d may include an Internet or cellular connection. In these and other embodiments, each path, including multiple paths between the same two edge network devices 410, may each include a unique score. Using such unique scores, the edge network device 410 may determine which path to be used.

In some embodiments, if multiple paths have the same score representing the best score for the rerouting application traffic, the edge network device 410a may route the traffic along the multiple paths with the best score. For example, a first flow of the rerouting application may be routed along the first path and a second flow of the rerouting application may be routed along a second path with the same score as the first path. In determining whether to route along the first path or the second path, the edge network device 410a may perform a hash function based on the header contents of a packet, among other inputs. Depending on the output of the hash function, the flow may be routed to one of the first path or the second path. While described as the path or paths with the best score, the path with a score relative to a threshold may also be selected.

In some embodiments, the edge network device 410a may designate a primary path and a backup path for the rerouted path. The edge network device 410a may monitor the performance of the primary path of the rerouted path and, based on changes in the score for the primary path, the edge network device 410a may reroute the traffic to the backup path or a different path. In some embodiments, the score may be monitored and/or rerouted relative to an SLA.

Modifications, additions, or omissions may be made to FIG. 4 without departing from the scope of the present disclosure. For example, while illustrated as including a certain number of edge network devices 410, the system 400 may include any number of edge network devices 410. As another example, while illustrated as including a single path between any two edge network devices 410, any number of paths over any number of mediums may be included between edge network devices 410.

Figure 5:
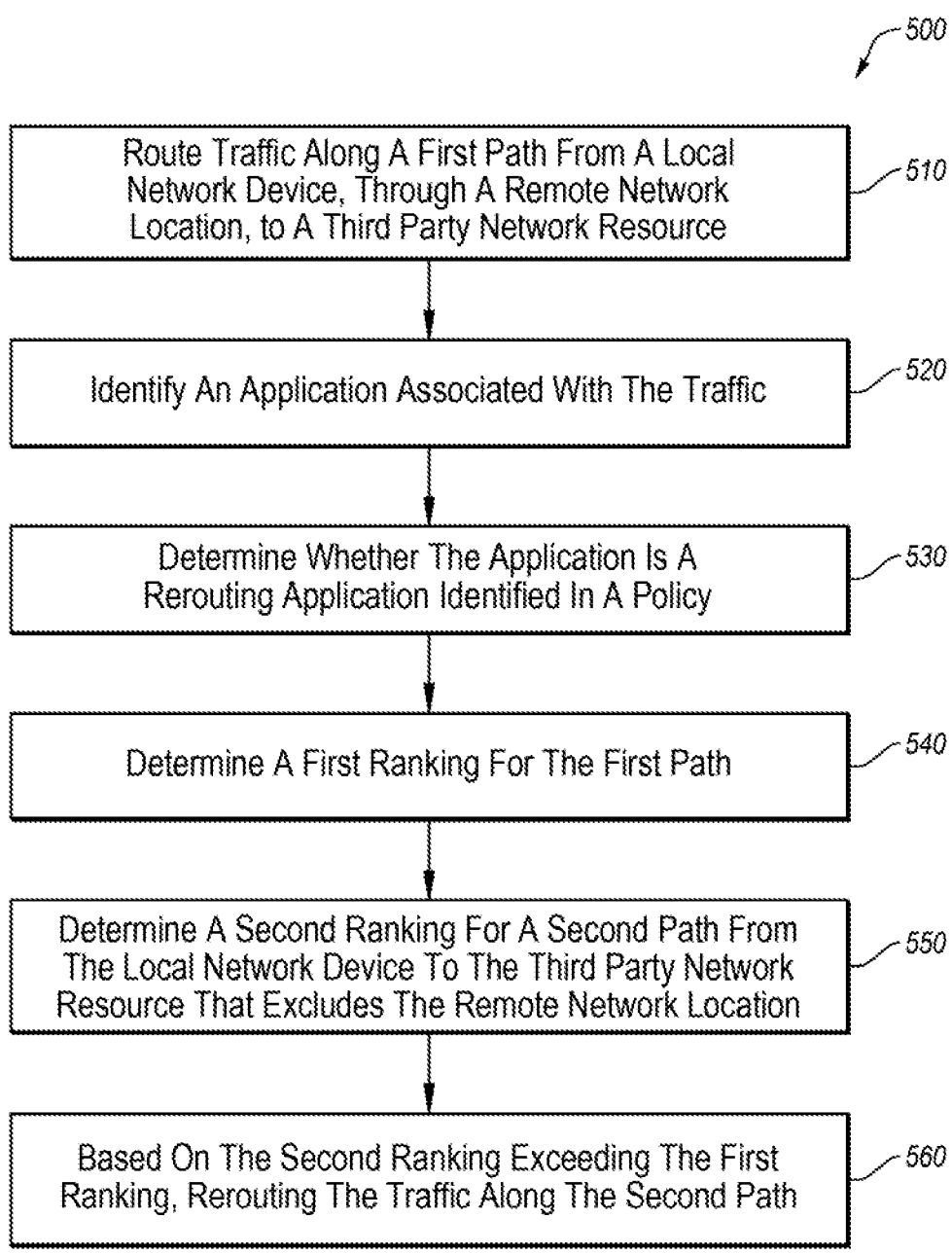
FIG. 5 illustrates a flowchart of an example method of routing network traffic within a software-defined network.

FIG. 5 illustrates a flowchart of an example method 500 of routing network traffic within a software-defined network, in accordance with one or more embodiments of the present disclosure. Although illustrated as discrete blocks, various blocks may be divided into additional blocks, combined into fewer blocks, or eliminated, depending on the particular implementation.

At block 510, traffic in a network may be routed along a first path from a local network device, through a remote network location, to a third party network resource. For example, a local computing device (such as the local computing device 450 of FIG. 4) may send requests or other network traffic through an edge network device (such as the edge network device 410a). In these and other embodiments, the edge network device may be configured to route data along a default path. For example, the default path may traverse an internal network domain to a data center, and then from the data center over the Internet to the third party network resource.

At block 520, an application associated with a flow may be identified. For example, the edge network device may utilize a deep packet inspection engine to identify the application associated with a flow. As another example, the edge network device may monitor a URL in a DNS query to determine that traffic directed to the IP address in the DNS response is associated with a given application associated with the URL.

At block 530, a determination may be made as to whether the application associated with the flow is a rerouting application. For example, an edge networking device may compare an identified application with a stored database or list of known rerouting applications. At block 540, a first ranking may be determined for the first path. For example, the edge network devices may include a first score of the performance of the first path through the internal network domain and combine the first score with a second score of the first path outside of the internal network domain to derive the first ranking. In these and other embodiments, the first ranking may represent the performance of the default path. The first score and/or the second score may be based on any number of factors, including jitter, latency, loss, bandwidth, and/or other factors associated with network performance.

At block 550, a second ranking may be determined for the second path, where the second path may include from the local network device to the third party network resource, and exclude the remote network location. For example, the second path may include a rerouting path while the first path represents a default path. In some embodiments, the block 550 may be repeated for any number of possible or potential rerouting paths. In some embodiments, the ranking for the second path may be determined in a similar or comparable manner to that used in determining the first ranking at block 540.

At block 560, based on the second ranking exceeding the first ranking, the traffic may be rerouted along the second path. For example, based on the second path (e.g., the rerouting path) having a higher ranking than the first path (e.g., the default path) by a threshold amount, the traffic for a given flow may be rerouted along the second path. In some embodiments, such a threshold may include any increase of the second ranking over the first ranking. Additionally or alternatively, the threshold may include some value such that the flows continue along the first path (e.g., the default path) until the performance of the second path (e.g., the rerouting path) by a margin sufficient to justify the departure from the default operation.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
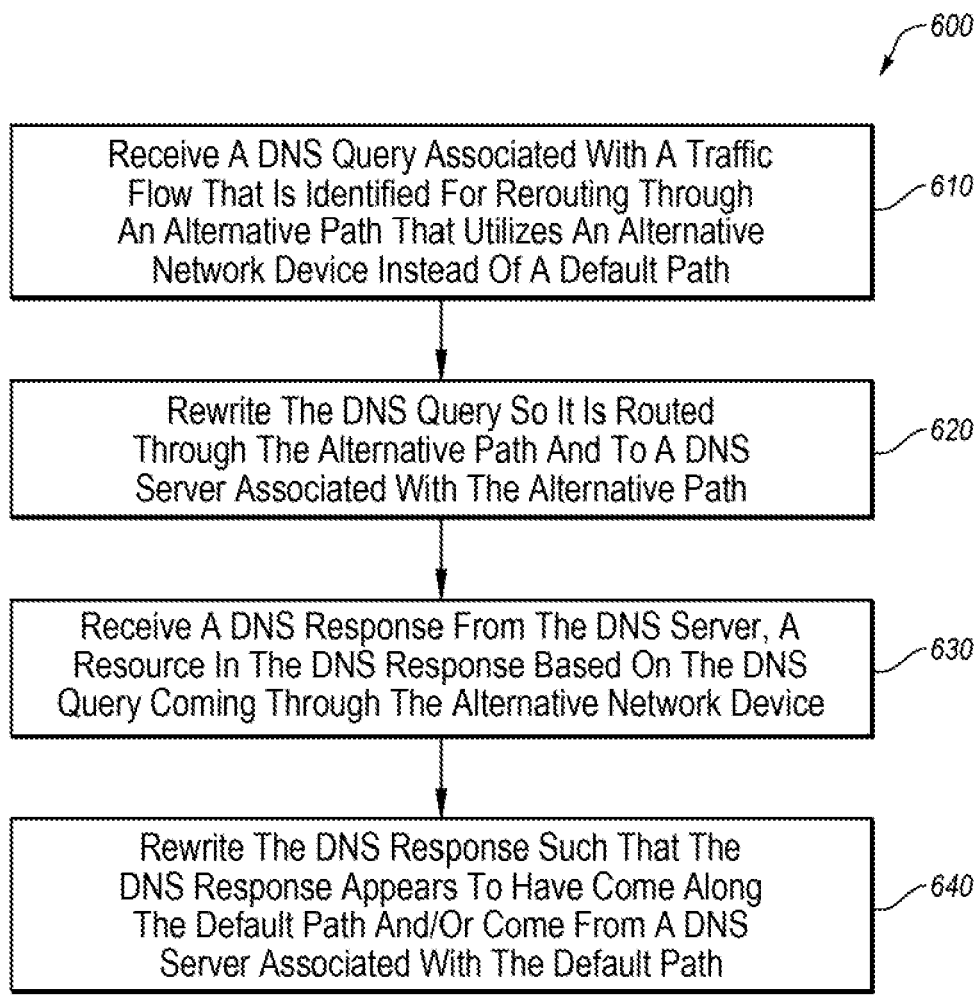
FIG. 6 illustrates a flowchart of an example method of rerouting a domain name system (DNS) request.

FIG. 6 illustrates a flowchart of an example method 600 of rerouting a domain name system (DNS) request, in accordance with one or more embodiments of the present disclosure. Although illustrated as discrete blocks, various blocks may be divided into additional blocks, combined into fewer blocks, or eliminated, depending on the particular implementation. At block 610, a DNS query may be received where the DNS query is associated with a traffic flow identified for rerouting through an alternative path that utilizes an alternative network device instead of a default path. For example, an enterprise or organization may operate and/or otherwise have a dedicated DNS server or service associated with the organization (such as the DNS server 470b of FIG. 4). An edge network device (such as the edge network devices 410 of FIG. 4) may receive the DNS query from a local computing device (such as the local computing device 450 of FIG. 4). The edge network device may be configured to typically route DNS queries to the dedicated DNS server by routing such queries to an edge network device proximate the dedicated DNS server, for example, in a data center. However, the edge network device may determine that the DNS query is associated with a flow identified for rerouting to the alternative edge network device, such as being associated with a rerouting application. In some embodiments, the DNS query may include a query for a third party resource and a URL of the DNS query may be associated with the third party resource. At block 620, the DNS query may be rewritten such that the DNS request is routed through the alternative path and to a DNS server associated with the alternative path. For example, the edge network device may route the DNS query to the alternative edge network device (such as the edge network device 410c instead of the edge network device 410e). The alternative edge network device may provide access to an external network domain such as the Internet such that the DNS query may be routed to a public DNS server proximate the alternative edge network device (such as the DNS server 470*a*). In some embodiments, the DNS request may be rewritten by changing the destination IP address to be that of a public DNS server rather than the dedicated DNS server.

At block 630, a DNS response may be received from the DNS server associated with the alternative path, and a resource in the DNS response may be based on the DNS query coming through the alternative network device rather than along the default path. For example, an edge network device may receive the DNS response with an IP address for a third party resource based on the URL of the DNS query. In these and other embodiments, the IP address that is provided may be provided by the DNS server based on the DNS query coming through the alternative network device rather than the default path. For example, if the default path goes to a data center in Boston, Mass. and then to an associated DNS server in New York, N.Y. for a third party resource with access in New York, N.Y., a DNS query regarding the third party resource may return the IP address for the access point to the third party resource in New York, N.Y. However, if the DNS query is routed to a DNS server in Seattle, Wash. and the third party resource has access in Seattle, Wash. or Los Angeles, Calif., the DNS response may include the IP address for one of the Seattle, Wash. or the Los Angeles, Calif. access points before the New York, N.Y. access point. Thus, in some embodiments, a resource in the DNS response may be based on the path which the DNS query takes, such as the path utilizing the alternative network device rather than the default path.

At block 640, the DNS response may be rewritten such that the DNS response appears to have come along the default path and/or come from a DNS server associated with the default path. For example, the edge network device that rerouted the DNS query and/or rewrote the DNS query at the block 620 may monitor for the DNS response associated with the DNS query. The edge network device may rewrite the DNS response, such as by rewriting the destination IP address or the source IP Address of the information such that the DNS response appears to have been sent along the default path or from a DNS server associated with the default path. For example, in some embodiments, a local computing device submitting the DNS query may be configured to reject a DNS response from a DNS server other than a dedicated DNS server. In these and other embodiments, by rewriting the DNS query and the DNS response, the local computing device submitting the DNS query and/or the DNS server responding to the DNS query may handle and submit DNS queries according to their default operations, but the DNS query may be rerouted. In some embodiments, the local computing device submitting the DNS query and/or the DNS server responding to the DNS query may be unaware that such rerouting has taken place.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 7:
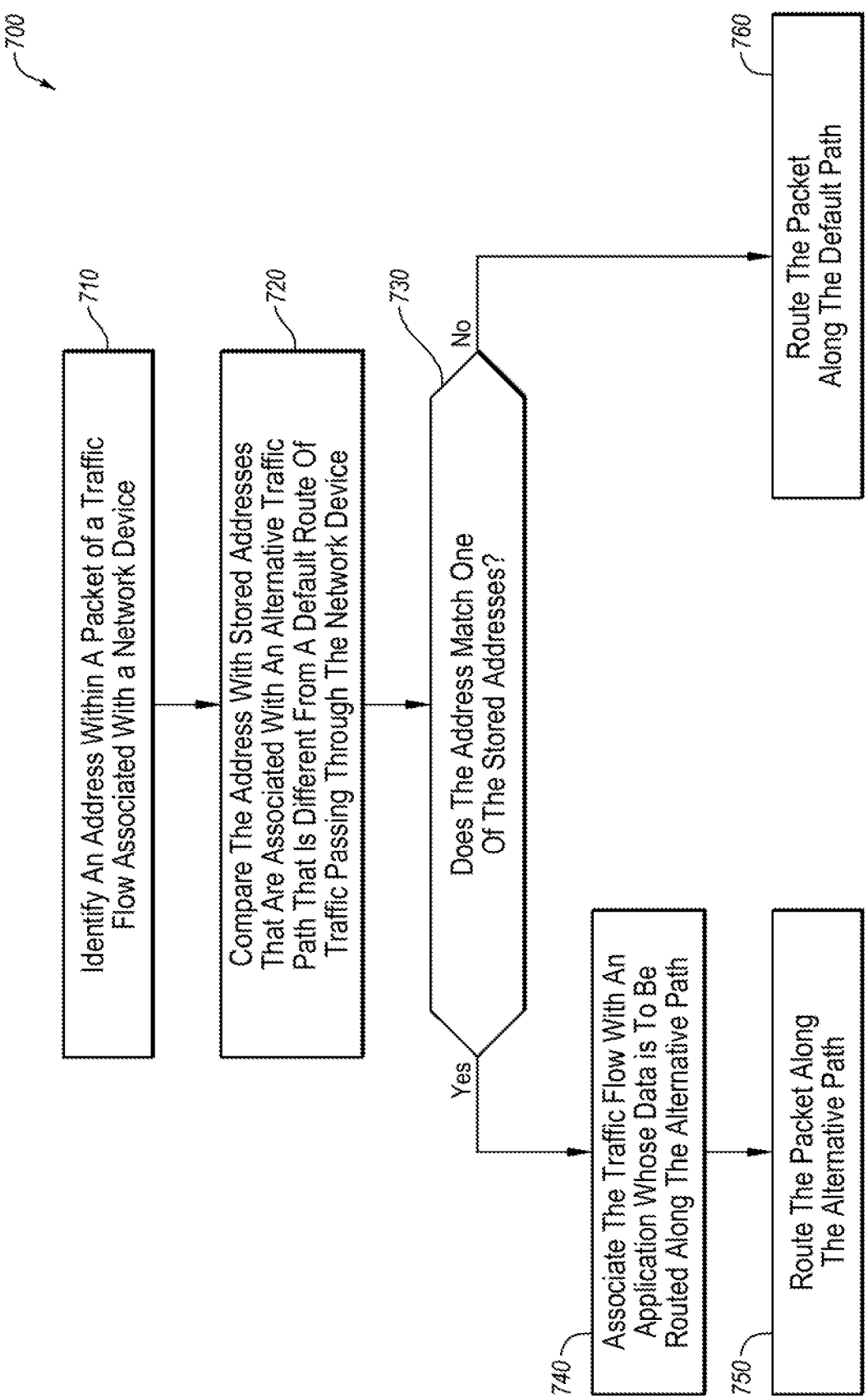
FIG. 7 illustrates a flowchart of another example method of routing traffic.

FIG. 7 illustrates a flowchart of another example method 700 of routing traffic, in accordance with one or more embodiments of the present disclosure. Although illustrated as discrete blocks, various blocks may be divided into additional blocks, combined into fewer blocks, or eliminated, depending on the particular implementation.

At block 710, an address within a packet of traffic flow associated with a network device may be identified. For example, an edge network device (such as the edge network devices 410 of FIG. 4) may identify a destination IP address of a packet within a traffic flow. Additionally or alternatively, the address may include a URL of a DNS request, or a deep packet inspection engine or other packet analyzer of the edge network device may determine an address of the packet.

At block 720, the address may be compared with one or more stored addresses that are associated with an alternative traffic path that is different from a default route of traffic passing through the network device. For example, an edge network device may store a list, database, or other storage structure of rerouting applications and associated addresses. For example, a given rerouting application may have associated URLs, destination IP addresses, or other addresses associated with the rerouting application. Additionally or alternatively, the list, database, or other storage structure may include a rerouting path to be taken for the rerouting application. In some embodiments, the stored rerouting path may be periodically updated. In some embodiments, the edge network device may compare the address identified at block 710 with the stored addresses to determine if the traffic flow. Any of a variety of approaches may be used to identify and/or store addresses in the network device for comparison, of which FIGS. 8 and 9 are two examples.

At block 730, a determination may be made as to whether the address identified in the block 710 matches one of the stored addresses. If the address matches one of the stored addresses, the method 700 may proceed to block 740. If the address does not match one of the stored addresses, the method may proceed to block 760.

At block 740, the traffic flow may be associated with an application whose data is to be routed along the alternative path. For example, if the address matches one of the stored addresses, the traffic flow may be labeled or otherwise identified as being associated with a rerouting application, such as the rerouting application stored as associated with the stored address. At block 750, the packet may be routed along the alternative path. For example, based on the traffic flow being identified as being associated with a rerouting application, the traffic flow may be rerouted along a rerouted path as described in the present disclosure. In some embodiments, the alternative path may be selected by comparing scores or rankings of one or more potential paths through an internal network domain and/or an external network domain and selecting the path with the best score or a score above a threshold as the alternative path. One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 8:
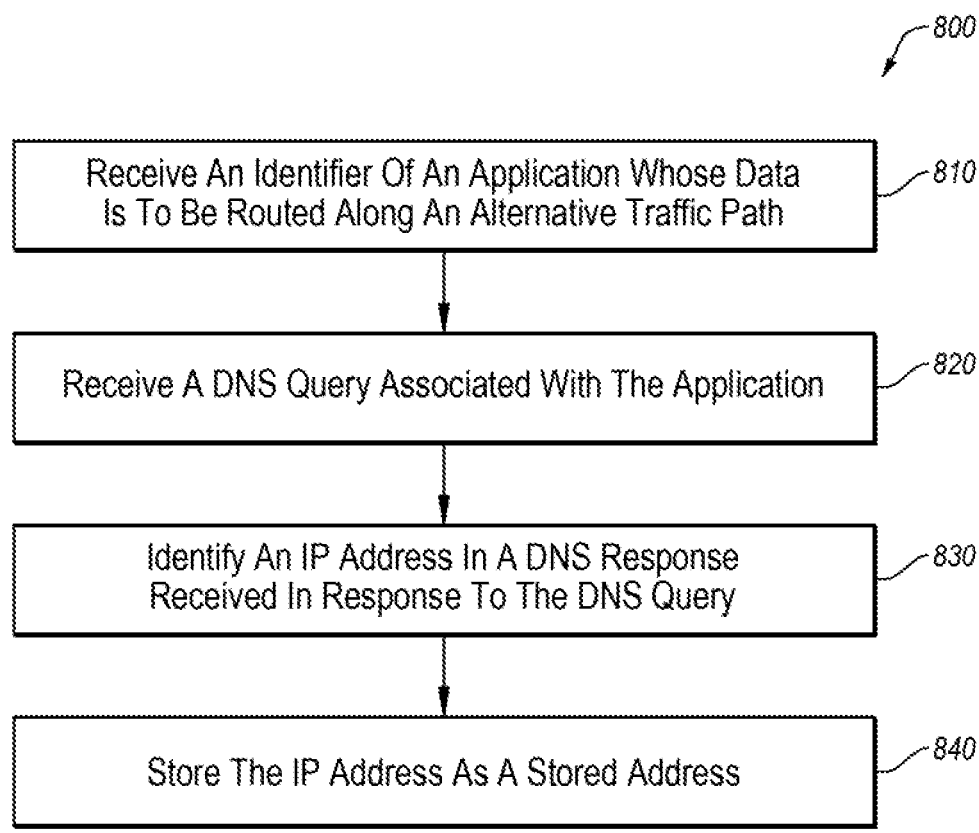
FIG. 8 illustrates a flowchart of an example method of obtaining an address
Figure 9:
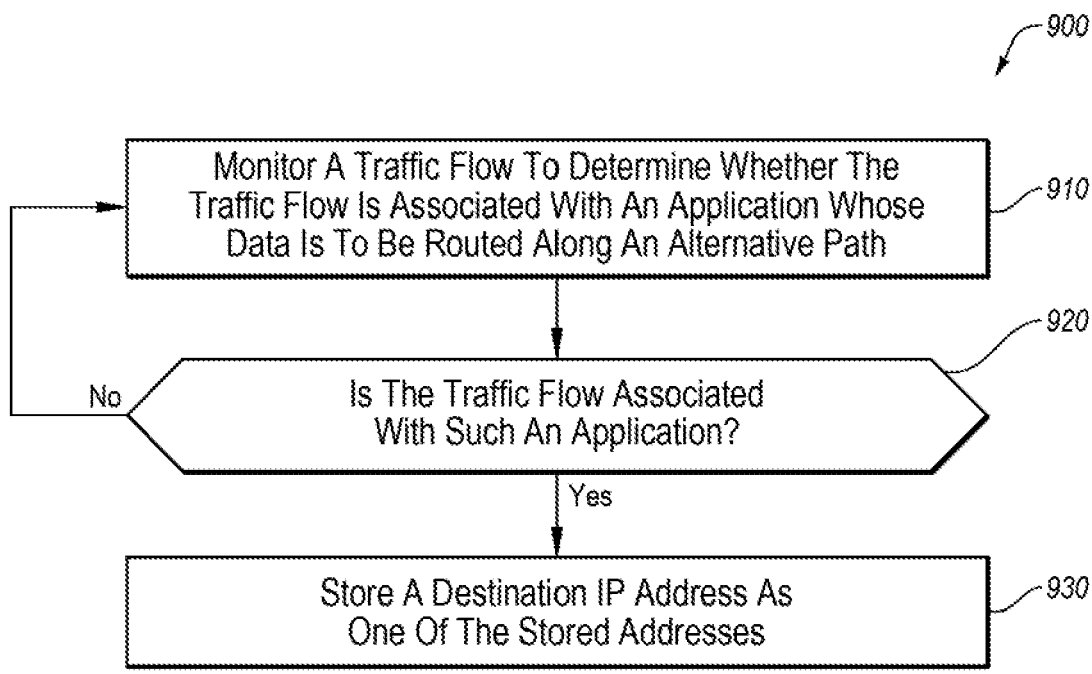
FIG. 9 illustrates a flowchart of another example method of obtaining an address.

FIG. 8 illustrates a flowchart of an example method 800 of obtaining an address, in accordance with one or more embodiments of the present disclosure. Although illustrated as discrete blocks, various blocks may be divided into additional blocks, combined into fewer blocks, or eliminated, depending on the particular implementation.

At block 810, an identifier of an application whose data is to be routed along an alternative traffic path may be received.

For example, an edge network device (such as the edge network devices 410 of FIG. 4) may receive a list of identifiers for rerouting applications from a control device (such as the control device 420 of FIG. 4). In these and other embodiments, the control device may periodically receive updates of what applications are rerouting applications and/or identifiers associated with the rerouting applications. For example, a vendor of a given rerouting application may provide one or more URLs associated with a rerouting application to an operator of the control device. For example, the control device may send a communication to the edge network device that Office 365® is a rerouting application, and the associated URLs include *.office365.com; home.office.com; portal.office.com; agent-.office. net; www.office.com; outlook.office365.com; portal. micro softonline.com; *.msocdn.com; appsforoffice.microsoft.com; suite.office.net; account.office.net; *.onmicrosoft.com; *.office.com; *.live.com; *.msedge.net; *.microsoft.com; *.portal.cloudappsecurity.com; etc.

At block 820, a DNS query associated with the application may be received. For example, the edge network device may receive a DNS query with a URL that matches one of the URLs associated with a rerouting application (e.g., portal.microsoftonline.com). In some embodiments, based on receiving such a DNS query, the edge network device may flag or otherwise store an indication of the particular DNS query such that the edge network device may identify the DNS response sent to respond to the particular DNS query.

At block 830, an IP address may be identified in a DNS response received in response to the DNS query of the block 820. For example, the edge network device may be monitoring for the DNS response associated with the DNS query of the block 820. After identifying the DNS response, the edge network device may identify the IP address within the DNS response. At block 840, the IP address may be stored as a stored address. For example, the edge network device may store the IP address of the block 830 as one of the stored addresses, such as those used in the method 700 of FIG. 7.

In some embodiments, the method 800 may allow a traffic flow to be routed along a rerouted path with the first packet of the traffic flow because monitoring the DNS query and response may cause the IP address of the rerouting application to be stored by the edge network device during the submission of a DNS query and before a flow is established between the actual third party resource at the IP address and a requesting computing device.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

FIG. 9 illustrates a flowchart of another example method 900 to obtain an address, in accordance with one or more embodiments of the present disclosure. Although illustrated as discrete blocks, various blocks may be divided into additional blocks, combined into fewer blocks, or eliminated, depending on the particular implementation.

At block 910, a traffic flow may be monitored to determine whether the traffic flow is associated with an application whose data is to be routed along an alternative path. For example, an edge network device (such as the edge network devices 410 of FIG. 4) may monitor various flows passing through the edge network device to determine an application associated with the flow. Such monitoring may be performed by a deep packet inspection engine or any other packet monitoring feature or service associated with a network device. The network device may also determine whether the identified application is a rerouting application.

At block 920, a determination may be made as to whether the traffic flow is associated with an application whose data is to be routed along an alternative path. For example, the edge network device may compare the identified application with a list of known rerouting applications. If the traffic flow is associated with a rerouting application, the method 900 may proceed to the block 930. If the traffic flow is not associated with a rerouting application, the method 900 may return to the block 910 to monitor additional traffic flows. At block 930, the destination IP address of the flow of the rerouting application may be stored as one of the stored addresses. For example, the edge network device may store the destination IP address of the packets of the traffic flow as one of the stored addresses, such as those used in the method 700 of FIG. 7.

In some embodiments, after storing the address, the edge network device may reroute the traffic flow along the rerouted path. However, such a rerouting may cause the packets of the flow to be rejected by the destination because the flow may be coming from a different NAT exit point. In these and other embodiments, such an interruption in the flow may cause a local computing device originating the flow to refresh or otherwise reconnect the flow be reestablishing a connection. In these and other embodiments, the edge network device may receive the flow for the refresh or reconnection, and may route the flow along the alternative path based on the address being stored in the edge network device.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 10:
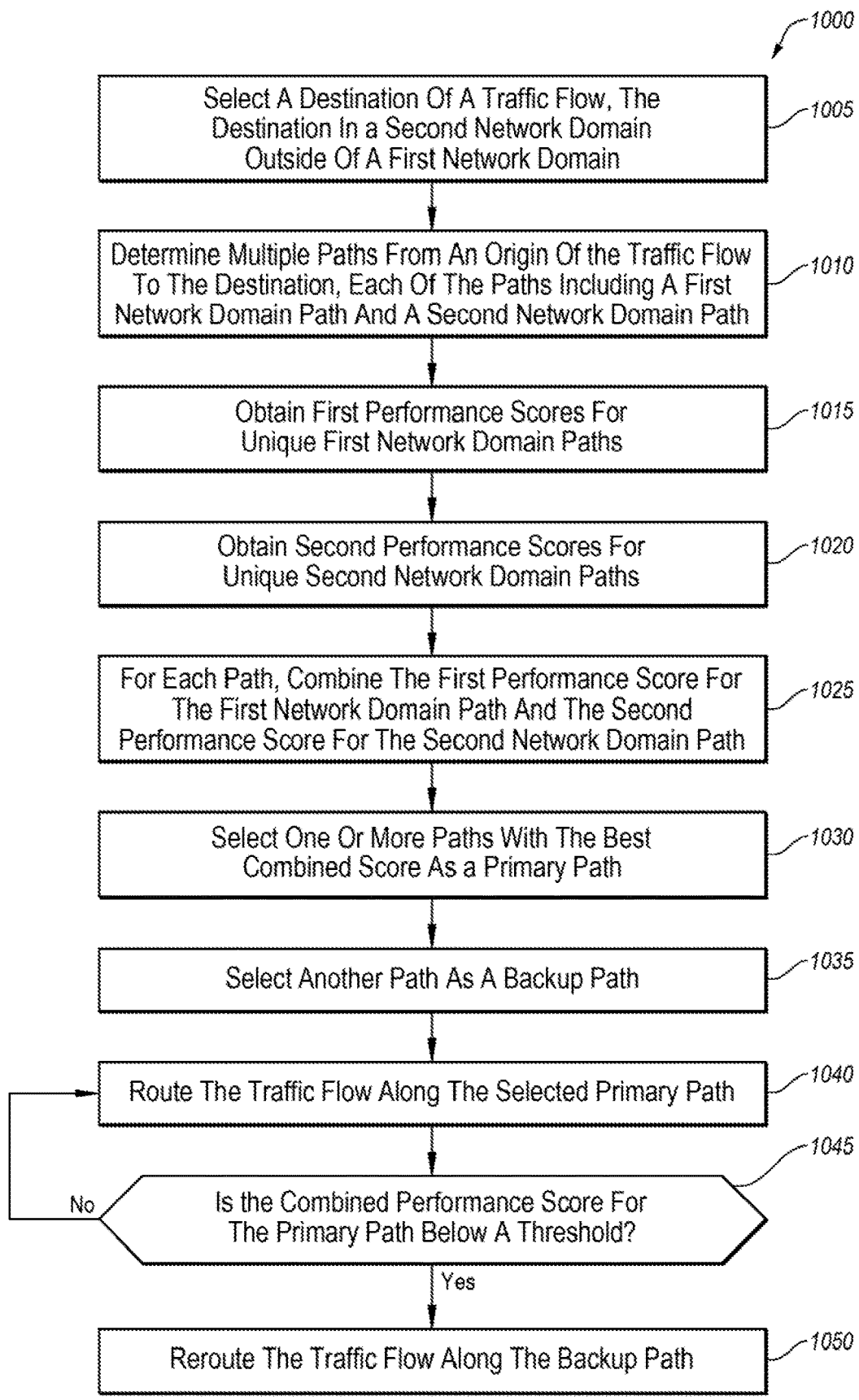
FIG. 10 illustrates a flowchart of an example method of route selection.

FIG. 10 illustrates a flowchart of an example method 1000 of route selection, in accordance with one or more embodiments of the present disclosure. Although illustrated as discrete blocks, various blocks may be divided into additional blocks, combined into fewer blocks, or eliminated, depending on the particular implementation.

At block 1005, a destination of a traffic flow may be selected, where the destination is in a second network domain outside of a first network domain. For example, a third party resource (such as the third party resource 480 of FIG. 4) may be selected as the destination of a traffic flow and the third party resource may be accessible via the Internet, and the access to the third party resource may be outside of an internal network domain (such as the internal network domain 405 of FIG. 4).

At block 1010, multiple paths from an origin of the traffic flow to the destination may be determined. Each of the paths may include a first network domain path and a second network domain path. For example, if a local computing device (such as the local computing device 450 of FIG. 4) originates the traffic flow to a destination like a third party resource, multiple paths from the local computing device to the third party resource may be determined, where each path includes a first network domain path (such as the paths 461-468 within the internal network domain 405) and a second network domain path (such as the paths 491, 492, and 493 outside of the internal network domain 405).

At block 1015, first performance scores for unique first network domain paths may be obtained. For example, a performance score may be obtained for each unique path through the internal network domain (Such as the paths 461-468). In these and other embodiments, the first network domain paths may include multiple paths between network devices using different mediums, such as a first path over the Internet and a second path using an MPLS connection, or a path may include combinations thereof. In some embodiments, the first performance scores may be monitored to obtain the first performance scores, or the performance of the first network domain paths may be periodically measured and associated first performance scores may be stored. The first performance scores may be based on jitter, latency, loss, bandwidth, or any other performance metric.

At block 1020, second performance scores for unique second network domain paths may be obtained. For example, a performance score for the path from an edge network device to the third party resource outside of the internal network domain may be obtained (such as the paths 491, 492, and 493). In these and other embodiments, the second performance scores may be obtained using an application layer reachability tool. Additionally or alternatively, performance along the second network domain paths may be periodically measured and the second performance scores may be stored.

At block 1025, for each path of the multiple paths from the origin to the destination, the first performance score for the first network domain path and the second performance score for the second network domain path may be combined. For example, with reference to FIG. 4, if the local computing device 450 is the origin and the third party resource 480 is the destination, the combinations may include the scores of the first network domain path 461 and the second network domain path 491 (461 and 491), 462 and 491, 463 and 491, 464 and 491, 465 and 493, 466 and 492, 467 and 493, and 468 and 492. In these and other embodiments, the first performance score and the second performance score may be combined using any operation, including addition, multiplication, or a complex mathematical combination. At block 1030, one or more paths with the best combined score may be selected as the primary path. For example and with reference to FIG. 4, if the combined score of the paths 466 and 492 was better than the combined score for the other potential paths, the path 466+492 may be selected as the primary path. As another example, if the paths 466 and 492 had the same score or a score within a threshold amount of the paths 465 and 493, both combined paths (466+492 and 465+493) may be selected as the primary path. For example, using equal cost multiple path (ECMP) routing, flows may be routed along either the 466+492 path or the 465+493 path, for example by hashing the header of a packet of the flow to determine which of the paths the flow may be routed along.

At block 1035, another path may be selected as a backup path based on the combined scores. For example, a path with the next best score, a path that utilizes a different NAT exit point, or a path that utilizes a different initial edge network device may be selected as the backup path. At block 1040, the traffic flow may be routed along the primary path. For example, the traffic flow may be routed along the path selected at block 1030. In some embodiments, the primary path selected at the block 1030 may be different than a default path for the internal network domain. For example, a default path may include routing flows to a data center, and the path selected at block 1030 may exit the internal network domain at a different location than the data center.

At block 1045, a determination may be made as to whether the combined performance score for the primary path is below a threshold. For example, the performance of the primary path may be periodically or continuously monitored. In some embodiments, the threshold may be based on an SLA of an application associated with the traffic flow. If a determination is made that the combined performance score is above the threshold, the method 1000 may return to the block 1040 such that the flow continues to be routed along the primary path. If a determination is made that the combined performance score is below the threshold, the method 1000 may proceed to the block 1050.

At block 1050, the traffic flow may be rerouted along the backup path. For example, if the performance along the primary path falls below an SLA associated with a rerouting application, the traffic flow may be rerouted along the backup path. In some embodiments, rather than routing the traffic flow along the backup path, the method may return to the blocks 1015, 1020, 1025, 1030, and/or 1040 such that the performance scores are reanalyzed and a new primary path may be selected based on the most recent performance scores, rather than a previously selected backup path.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 11:
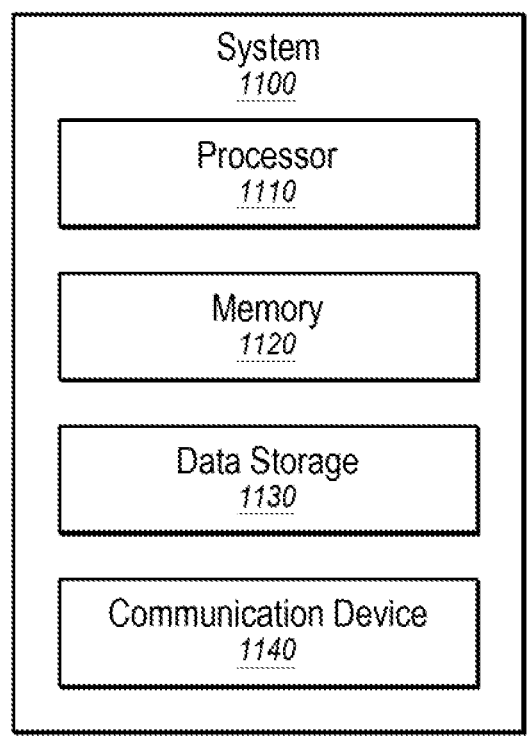
FIG. 11 illustrates an example computing system.

FIG. 11 illustrates an example computing system 1100, according to at least one embodiment described in the present disclosure. The system 1100 may include any suitable system, apparatus, or device configured to test software. The computing system 1100 may include a processor 1110, a memory 1120, a data storage 1130, and a communication unit 1140, which all may be communicatively coupled. In some embodiments, any of the network devices (e.g., the edge network devices 110, 210, 310, or 410 of FIGS. 1-4), control devices (e.g., the control devices 120, 220, 320, or 420 of FIGS. 1-4), local computing devices (e.g., the local computing device 450 of FIG. 4) or other computing devices of the present disclosure may be implemented as the computing system 1100. Additionally or alternatively, one or more of the network devices, control devices, local computing devices or other computing devices may be implemented as virtualized machines operating on a physical computing system such as the computing system 1100.

Generally, the processor 1110 may include any suitable special-purpose or general-purpose computer, computing entity, or processing device including various computer hardware or software modules and may be configured to execute instructions stored on any applicable computer-readable storage media. For example, the processor 1110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 11, it is understood that the processor 1110 may include any number of processors distributed across any number of network or physical locations that are configured to perform individually or collectively any number of operations described in the present disclosure. In some embodiments, the processor 1110 may interpret and/or execute program instructions and/or process data stored in the memory 1120, the data storage 1130, or the memory 1120 and the data storage 1130. In some embodiments, the processor 1110 may fetch program instructions from the data storage 1130 and load the program instructions into the memory 1120.

After the program instructions are loaded into the memory 1120, the processor 1110 may execute the program instructions, such as instructions to perform the methods 500, 600, 700, 800, 900, and/or 1000 FIGS. 5-10, respectively. For example, the processor 1110 may determine that a traffic flow is associated with a rerouting application and reroute the traffic flow along the path with the best performance score. As another example, the processor 1110 may rewrite DNS queries and/or DNS replies. As an additional example, the processor 1110 may route flows such that an NAT exit point associated with a rerouted path may be utilized. As an additional example, the processor 1110 may determine which path from multiple paths is the best path and reroute traffic accordingly.

The memory 1120 and the data storage 1130 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1110. In some embodiments, the computing system 1100 may or may not include either of the memory 1120 and the data storage 1130.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1110 to perform a certain operation or group of operations. The communication unit 1140 may include any component, device, system, or combination thereof that is configured to transmit or receive information over a network, such as an MPLS connection, the Internet, a cellular network (e.g., an LTE network), etc. In some embodiments, the communication unit 1140 may communicate with other devices at other locations, the same location, or even other components within the same system. For example, the communication unit 1140 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 1140 may permit data to be exchanged with a network and/or any other devices or systems described in the present disclosure. For example, the communication unit 1140 may allow the system 1100 to communicate with other systems, such as network devices, control devices, and/or other networks.

Modifications, additions, or omissions may be made to the system 1100 without departing from the scope of the present disclosure. For example, the data storage 1130 may be multiple different storage mediums located in multiple locations and accessed by the processor 1110 through a network.

As indicated above, the embodiments described in the present disclosure may include the use of a special purpose or general purpose computer (e.g., the processor 1110 of FIG. 11) including various computer hardware or software modules, as discussed in greater detail below. Further, as indicated above, embodiments described in the present disclosure may be implemented using computer-readable media (e.g., the memory 1120 or data storage 1130 of FIG. 11) for carrying or having computer-executable instructions or data structures stored thereon.

As used in the present disclosure the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and "one or more" to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B along, C alone, A and B together, A and C together, and B and C together, or A, B, and C together, etc. Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "a" or "b" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the term "first," "second," "third," etc., are used to distinguish between different elements as generic identifiers. Absence a showing that the terms "first" "second," "third," etc., connote a specific order, these terms should not be understood to connote a specific order. Furthermore, absence a showing that the terms "first," "second," "third," etc., connote a specific number of elements these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    determining a destination of a first traffic flow;
    determining multiple paths from an origin of the first traffic flow to the destination, wherein each path of the multiple paths comprises a respective set of segments, and wherein each path of the multiple paths includes an internal network domain segment through an internal network domain and an external network domain segment through an external network domain different from the internal network domain;
    obtaining performance scores for the respective set of segments of each path of the multiple paths;
    for each path of the multiple paths, determining a combined performance score comprising a combination of the performance scores for the respective set of segments of the path, wherein the combined performance score reflects a performance of the path within the internal network domain and a performance of the path within the external network domain;
    selecting a first path and an alternative path of the multiple paths based on the combined performance score associated with the first path and the combined performance score associated with the alternative path;
    routing the first traffic flow via the first path;
    based on a determination that an updated combined performance score associated with the alternative path exceeds the combined performance score associated with the first path by a threshold, rerouting a second traffic flow to the alternative path; and
    based on a determination that an updated combined performance score associated with the alternative path is the same as the combined performance score associated with the first path:
        comparing the performance of the first path within the internal network domain reflected by the combined performance score associated with the first path, to the performance of the alternative path within the internal network domain reflected by the updated combined performance score associated with the alternative path; and
        rerouting the second traffic flow to a selected one of the first path and the alternative path having a greater performance within the internal network domain.

2. The method of claim 1, wherein each respective set of segments of each path comprises a first respective network domain and a second respective network domain, and wherein the destination of the traffic flow is in the second respective network domain.

3. The method of claim 2, wherein routing the first traffic flow via the first path comprises routing the traffic flow via the first respective network domain and the second respective network domain associated with the respective set of segments of the first path, and wherein rerouting the second traffic flow via the alternative path comprises rerouting the second traffic flow via the first respective network domain and the second respective network domain associated with the respective set of segments of the alternative path.

4. The method of claim 2, wherein the first respective network domain comprises a first respective plurality of paths, wherein the second respective network domain comprises a second plurality of paths, and wherein determining the combined performance score for each path comprises combining a first performance score of each unique first path of the first respective plurality of paths and a second performance score of each unique second path of the second respective plurality of paths to yield a respective combined performance score of a first and second unique path of each path.

5. The method of claim 4, wherein the first path comprises a highest combined performance score selected based on the respective combined performance score of the first and second unique path.

6. The method of claim 1, further comprising:
    prior to rerouting the second traffic flow to the alternative path, updating the combined performance score associated with the first path and the combined performance score associated with the alternative path; and
    rerouting the second traffic flow to the alternative path when the updated combined performance score associated with the alternative path exceeds the updated combined performance score associated with the first path by the threshold.

7. The method of claim 1, wherein the first path is associated with a first combined performance score that is higher than a second combined performance score associated with the alternative path.

8. A system comprising:
one or more processors; and
at least one non-transitory computer-readable storage medium having stored thereon instructions which, when executed by the one or more processors, cause the one or more processors to:
  determine a destination of a first traffic flow;
  determine multiple paths from an origin of the first traffic flow to the destination, wherein each path of the multiple paths comprises a respective set of segments, and wherein each path of the multiple paths includes an internal network domain segment through an internal network domain and an external network domain segment through an external network domain different from the internal network domain;
  obtain performance scores for the respective set of segments of each path of the multiple paths;
  for each path of the multiple paths, determine a combined performance score comprising a combination of the performance scores for the respective set of segments of the path, wherein the combined performance score reflects a performance of the path within the internal network domain and a performance of the path within the external network domain;
  select a first path and an alternative path of the multiple paths based on the combined performance score associated with the first path and the combined performance score associated with the alternative path;
  route the first traffic flow via the first path;
  based on a determination that an updated combined performance score associated with the alternative path exceeds the combined performance score associated with the first path by a threshold, reroute a second traffic flow to the alternative path; and
  based on a determination that an updated combined performance score associated with the alternative path is the same as the combined performance score associated with the first path:
  compare the performance of the first path within the internal network domain reflected by the combined performance score associated with the first path, to the performance of the alternative path within the internal network domain reflected by the updated combined performance score associated with the alternative path; and
  reroute the second traffic flow to a selected one of the first path and the alternative path having a greater performance within the internal network domain.

9. The system of claim 8, wherein each respective set of segments of each path comprises a first respective network domain and a second respective network domain, and wherein the destination of the traffic flow is in the second respective network domain.

10. The system of claim 9, wherein routing the first traffic flow via the first path comprises routing the traffic flow via the first respective network domain and the second respective network domain associated with the respective set of segments of the first path, and wherein rerouting the second traffic flow via the alternative path comprises rerouting the second traffic flow via the first respective network domain and the second respective network domain associated with the respective set of segments of the alternative path.

11. The system of claim 9, wherein the first respective network domain comprises a first respective plurality of paths, wherein the second respective network domain comprises a second plurality of paths, and wherein determining the combined performance score for each path comprises combining a first performance score of each unique first path of the first respective plurality of paths and a second performance score of each unique second path of the second respective plurality of paths to yield a respective combined performance score of a first and second unique path of each path.

12. The system of claim 11, wherein the first path comprises a highest combined performance score selected based on the respective combined performance score of the first and second unique path.

13. The system of claim 9, at least one non-transitory computer-readable storage medium having stored thereon instructions which, when executed by the one or more processors, cause the one or more processors to:
  prior to rerouting the second traffic flow to the alternative path, update the combined performance score associated with the first path and the combined performance score associated with the alternative path; and
  reroute the second traffic flow to the alternative path when the updated combined performance score associated the alternative path exceeds the updated combined performance score associated with the first path by the threshold.

14. The system of claim 8, wherein the first path is associated with a first combined performance score that is higher than a second combined performance score associated with the alternative path.

15. At least one non-transitory computer-readable storage medium comprising:
  instructions which, when executed by one or more processors, cause the one or more processors to:
    determine a destination of a first traffic flow;
    determine multiple paths from an origin of the traffic flow to the destination, wherein each path of the multiple paths comprises a respective set of segments, and wherein each path of the multiple paths includes an internal network domain segment through an internal network domain and an external network domain segment through an external network domain different from the internal network domain;
    obtain performance scores for the respective set of segments of each path of the multiple paths;
    for each path of the multiple paths, determine a combined performance score comprising a combination of the performance scores for the respective set of segments of the path, wherein the combined performance score reflects a performance of the path within the internal network domain and a performance of the path within the external network domain;
    select a first path and an alternative path of the multiple paths based on the combined performance score associated with the first path and the combined performance score associated with the alternative path;
    route the first traffic flow via the first path;
    based on a determination that an updated combined performance score associated with the alternative path exceeds the combined performance score associated with the first path by a threshold, reroute a second traffic flow to the alternative path; and based on a determination that an updated combined performance score associated with the alternative path is the same as the combined performance score associated with the first path:

compare the performance of the first path within the internal network domain reflected by the combined performance score associated with the first path, to the performance of the alternative path within the internal network domain reflected by the updated combined performance score associated with the alternative path; and reroute the second traffic flow to a selected one of the first path and the alternative path having a greater performance within the internal network domain.

16. The at least one non-transitory computer-readable storage medium of claim 15, wherein each respective set of segments of each path comprises a first respective network domain and a second respective network domain, and wherein the destination of the traffic flow is in the second respective network domain.

17. The at least one non-transitory computer-readable storage medium of claim 16, wherein routing the first traffic flow via the first path comprises routing the traffic flow via the first respective network domain and the second respective network domain associated with the respective set of segments of the first path, and wherein rerouting the second traffic flow via the alternative path comprises rerouting the second traffic flow via the first respective network domain and the second respective network domain associated with the respective set of segments of the alternative path.

18. The at least one non-transitory computer-readable storage medium of claim 16, wherein the first respective network domain comprises a first respective plurality of paths, wherein the second respective network domain comprises a second plurality of paths, and wherein determining the combined performance score for each path comprises combining a first performance score of each unique first path of the first respective plurality of paths and a second performance score of each unique second path of the second respective plurality of paths to yield a respective combined performance score of a first and second unique path of each path.

19. The at least one non-transitory computer-readable storage medium of claim 18, wherein the first path comprises a highest combined performance score selected based on the respective combined performance score of the first and second unique path.

20. The at least one non-transitory computer-readable storage medium of claim 15, comprising instructions which, when executed by the one or more processors, cause the one or more processors to:

prior to rerouting the second traffic flow to the alternative path, update the combined performance score associated with the first path and the combined performance score associated with the alternative path; and reroute the second traffic flow to the alternative path when the updated combined performance score associated alternative path exceeds the updated combined performance score associated with the first path by the threshold.

* * * * *